(12) United States Patent
Curlander et al.

(10) Patent No.: US 11,370,559 B1
(45) Date of Patent: Jun. 28, 2022

(54) UNMANNED AERIAL VEHICLE EXPANDABLE LANDING MARKER SYSTEM

(71) Applicant: Amazon Technologies, Inc., Seattle, WA (US)

(72) Inventors: James Christopher Curlander, Bellevue, WA (US); Brandon William Porter, Yarrow Point, WA (US); Paul Viola, Seattle, WA (US); Leon Robert Warman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 702 days.

(21) Appl. No.: 15/457,831

(22) Filed: Mar. 13, 2017

(51) Int. Cl.
*B64F 1/18* (2006.01)
*B64C 39/02* (2006.01)
*G09F 19/22* (2006.01)

(52) U.S. Cl.
CPC .............. *B64F 1/18* (2013.01); *B64C 39/024* (2013.01); *G09F 19/22* (2013.01); *B64C 2201/128* (2013.01)

(58) Field of Classification Search
CPC .... B64F 1/007; B64F 1/18; B64F 1/02; B64F 1/025; B64C 2201/18; E04H 15/20
See application file for complete search history.

(56) References Cited

U.S. PATENT DOCUMENTS

| | | | | |
|---|---|---|---|---|
| 4,629,358 A * | 12/1986 | Springston | ................ | E01C 5/22 404/35 |
| 6,266,142 B1 * | 7/2001 | Junkins | .................... | G01S 5/163 356/623 |
| 9,221,557 B1 * | 12/2015 | Friesel | ..................... | B64F 1/025 |
| 2004/0208746 A1 * | 10/2004 | Crocker | ................ | F04D 29/325 416/183 |
| 2004/0256519 A1 * | 12/2004 | Ellis | ....................... | B64C 39/024 244/110 E |
| 2008/0111043 A1 * | 5/2008 | Chen | .................... | A47B 95/043 248/345.1 |
| 2012/0032025 A1 * | 2/2012 | Allen | ........................ | B64F 1/02 244/110 C |
| 2013/0000539 A1 * | 1/2013 | Wolff | ........................ | B64F 1/02 114/261 |
| 2015/0317597 A1 * | 11/2015 | Shucker | ............. | G06Q 10/0833 235/375 |
| 2016/0039542 A1 * | 2/2016 | Wang | ..................... | B64D 39/00 701/2 |
| 2017/0369184 A1 * | 12/2017 | Di Benedetto | ........... | B64F 1/00 |
| 2018/0053139 A1 * | 2/2018 | Stoman | ................ | G05D 1/0676 |
| 2018/0134412 A1 * | 5/2018 | Poh | ........................... | B64F 1/04 |
| 2019/0187724 A1 * | 6/2019 | Li | ........................ | G05D 1/0676 |

* cited by examiner

*Primary Examiner* — Timothy D Collins
*Assistant Examiner* — Terri L Filosi
(74) *Attorney, Agent, or Firm* — Lee & Hayes, P.C.

(57) ABSTRACT

An unmanned aerial vehicle (UAV) expandable landing marker system may include a an expandable volume. The landing marker may be expanded prior to arrival of a UAV delivering an item to be received by the landing marker. The landing marker may be expanded by regulating an amount of fluid in the volume. An anchor may be coupled to the landing marker to restrain movement of the expanded landing marker. An optional retraction mechanism may retract the landing marker. The landing marker can be retracted with the deposited item, moving the item to a location for later retrieval.

20 Claims, 11 Drawing Sheets

UNMANNED AERIAL VEHICLE EXPANDABLE LANDING MARKER SYSTEM

BACKGROUND

Unmanned aerial vehicles (UAVs) are increasingly becoming a part of daily life. One of the emerging uses of UAVs is their use as in delivery of items to consumers. UAVs present many benefits in consumer delivery, including an ability to quickly deliver a shipment to a customer at a desired location. From restaurant take-out to consumer goods, UAV delivery of items is gaining in popularity.

Delivery of an item to a customer residence presents many challenges, especially in dense urban environments where space is limited. Some residences have little or no open space available for permanent use by a UAV to land or deposit objects. Markers may be used to designate a location to land or deposit an item. The location of the marker may be determined by many factors, such as distances from obstacles (e.g., trees, structures, people, etc.), property rights, and other factors. Typically, a person will place a marker in a location for use by the UAV, and then remove the marker after use. Once an item is delivered to an outdoor location, it can be exposed to various weather conditions and/or may be unsecured, allowing for harm to the item or theft of the item before a customer can retrieve it.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
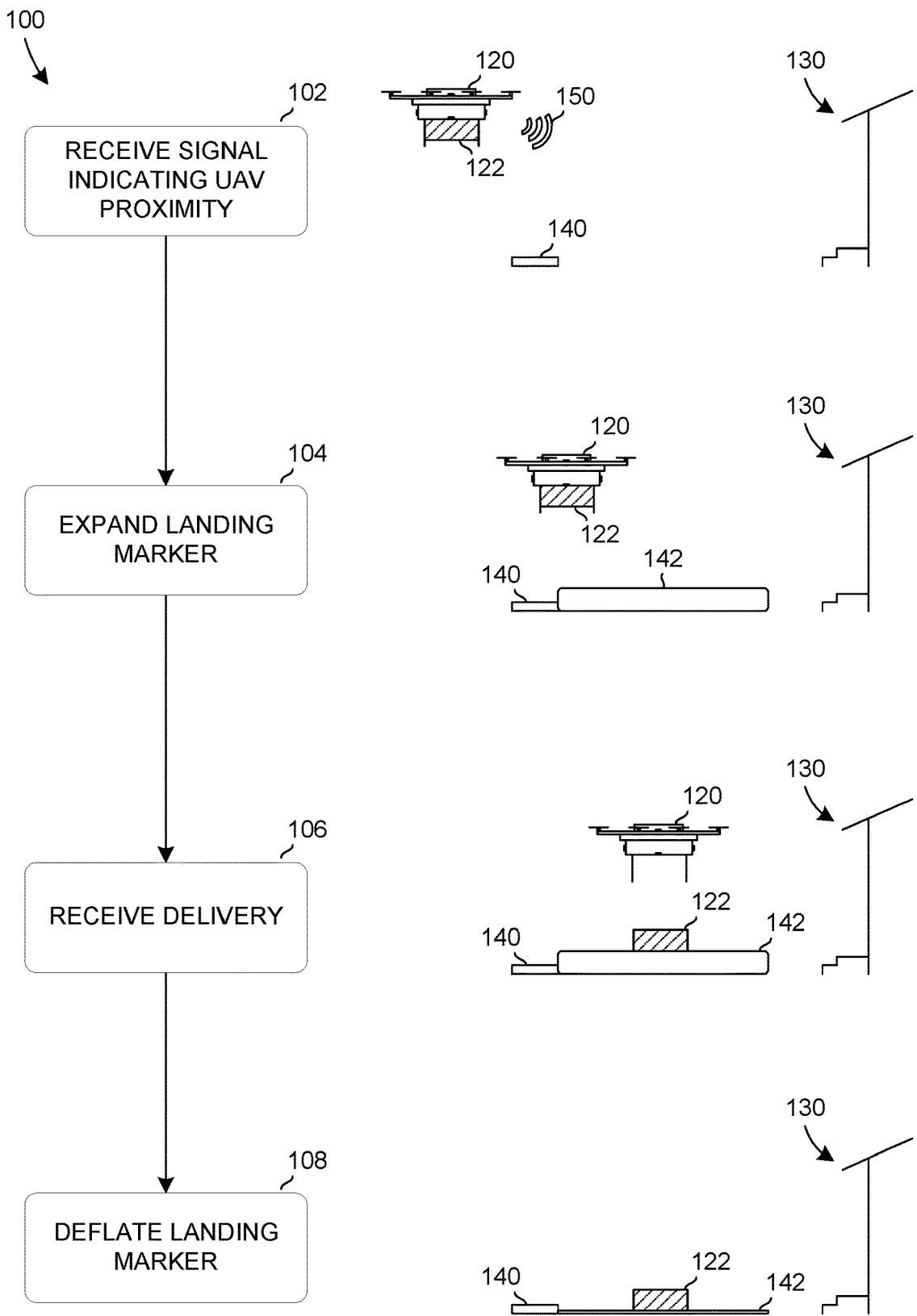
FIG. 1 is a pictorial flow diagram of an illustrative process performed in part by a UAV expandable landing marker system.

This disclosure is related to an unmanned aerial vehicle (UAV) landing marker system that includes an expandable landing marker that designates a location for the delivery of an item transported by the UAV and/or a landing location of the UAV. The UAV expandable landing marker may be expanded from a first, smaller size, to a second, larger size. The expansion may enable greater visibility and/or detection of the marker, as well as a larger target to receive a deposited item and/or the UAV if the UAV lands on the marker. To transition sizes, the UAV expandable landing marker may be filled with air, water and/or other fluid(s). In the expanded state, the UAV expandable landing marker may have secondary benefits such as to absorb an impact force of an item received into the marker and/or dampen the impact of the UAV landing on the marker to reduce a likelihood of damage to the item and/or the UAV. Other benefits may also exist, as discussed in more detail below.

Before a delivery time, after communication from the UAV itself, and/or after another triggering event, the landing marker can be expanded from a compact state to a substantially larger expanded state. The landing marker can be anchored in a location so that it remains substantially stationary and is not substantially moved by an external force, such as wind acting on the landing marker. The UAV can use onboard instrumentation to determine an exact location of the expanded marker, receive signals from the landing marker system indicative of the positioning of the expanded marker, and/or have previously received data regarding the expected positioning of the expanded marker. The expanded landing marker can receive the delivery from the UAV and/or the UAV can land on the marker to deposit the delivery. Once the item has been received on or by the landing marker, the landing marker can retract. The retraction of the landing marker can return the marker to the substantially compact state for storage and/or can include the transport of and/or securement of the delivered item.

The UAV expandable landing marker system can include various systems, sub-systems, elements and/or components. For example, the UAV expandable landing marker system can include an expansion mechanism or system that can initiate or automatically expand the landing marker in preparation for a UAV delivery. These can also include a retraction mechanism or system that retracts the expanded landing marker. The landing marker can be retracted with the delivered item, which the marker can envelope or transport the delivered item so that the item can be secured for retrieval by a customer. The landing marker can also be shaped to direct the delivered item to an area on or within the landing marker and/or an area external the landing marker, such as a delivered item storage area.

The landing marker and/or UAV expandable landing marker system can be integrated into a structure, housing or object to obscure or disguise the landing marker and/or UAV expandable landing marker system. The obscuring of the marker and/or system can blend the marker and/or system within its surroundings, such as a typical object found in the setting. In this manner, the landing marker and/or UAV expandable landing marker system is not obvious to an observer when not in use.

FIG. 1 is a pictorial flow diagram of an illustrative process 100 of a UAV expandable landing marker system. The process 100 shows an example operation of the UAV expandable landing marker system.

At 102, a UAV 120 carrying an item 122 (or package) approaches the delivery location 130. The UAV expandable landing marker system 140 may receive a signal 150 indicating the proximity of the UAV 120. The signal 150 can be transmitted by the UAV 120 to the UAV expandable landing marker system 140, or can be transmitted from another location or system, such as a local Wi-Fi system of the delivery location 130 or a signal transmitted through a cellular network to the UAV expandable landing marker system 140. However, other triggers may be used to determine when to expand the UAV expandable landing marker.

At 104, in response to the received signal 150, the UAV expandable landing marker system 140 deploys and/or expands a landing marker 142. The landing marker 142 expands from an initial compact state to a larger, expanded state, such as by filling a cavity with air or another fluid. The expanded state of the landing marker 142 has a larger volume and possibly a larger surface area than the landing marker 142 in the initial, compact state. The increase surface area of the landing marker 142 provides a larger area onto which the item 122 of the UAV 120 can be deposited. Additionally, the larger size of the expanded landing marker 142 can allow systems (e.g., image sensors, etc.) of the UAV 120 to easily identify the proper location at which to deposit the item 122.

At 106, the UAV 120 and/or the item 122 is received onto the landing marker 142 in the expanded state. The item 122 can be released from the UAV 120 at a height above the landing marker 142, the item 122 landing onto an upper surface of the landing marker 142. Alternatively, the UAV 120 itself can land onto the upper surface of the landing marker 142, release the item 122 and then take-off, leaving the item 122 on the upper surface of the landing marker 142.

At 108, after the item 122 has been deposited onto the upper surface of the landing marker 142, the landing marker 142 can be reduced/deflated with the item 122 remaining on the upper surface of the landing marker 142 until the item 122 is retrieved. The deflation may be performed actively, such as by exhaust air from a cavity, or passively, such as by discontinuing inflation of the cavity and/or opening a release valve. In some embodiments, the expanded landing marker 142 can be reduced/deflated and retracted with the item 122, thereon. The UAV expandable landing marker system 140 may contain or enclose the item 122 to protect the item 122 from environmental conditions, such as weather. The UAV expandable landing marker system 140 may move the item 122 to a location by retracting the landing marker 142. The item 122 may be held at the location until retrieved by a person or other device.

Figure 2A:
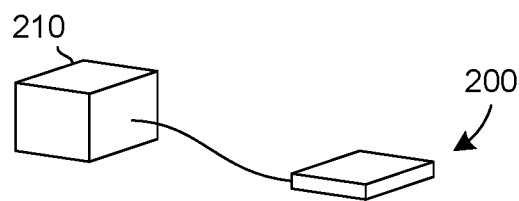
FIGS. 2A and 2B are perspective views of an example UAV expandable landing marker of a UAV expandable landing marker system in an unexpanded state and an expanded state.
Figure 2B:
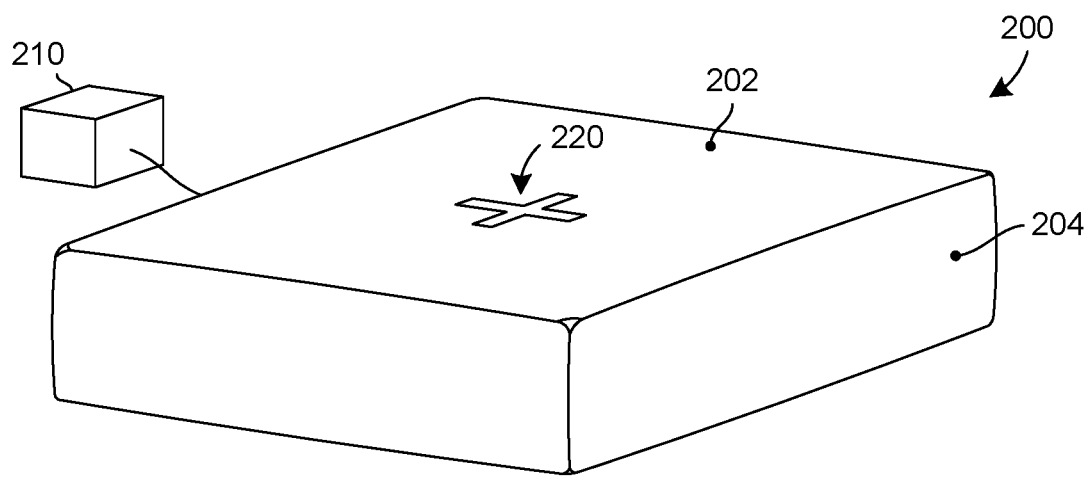

FIGS. 2A and 2B are perspective views of an example landing marker 200 of a UAV expandable landing marker system. The landing marker 200 is shown in an unexpanded state in FIG. 2A and in an expanded state in FIG. 2B. When the landing marker 200 is in an expanded state, such as shown in FIG. 2B, the landing marker has an increased volume and possibly a larger upper surface area 202 than the landing marker 200 in an unexpanded state, such as shown in FIG. 2A. The expansion may be performed by a controller 210, which may cause air or another fluid to fill a volume to cause expansion of the landing marker 200. For example, the controller 210 may include an air compressor to cause air to enter a volume or cavity in the landing marker. In some embodiments, the controller 210 may operate a valve to allow water or another fluid to enter the volume of the landing marker 200. The controller 210 may operate a valve to exhaust air, water, and/or other fluids from the volume to return the landing marker 200 to the unexpanded state. In some embodiments, the material that forms at least part of the landing marker 200 may have elastic properties and may stretch to increase a volume and/or size of the upper surface area 202 of the landing marker 200. However, the upper surface area 202 may increase due to the landing marker 200 unfolding or otherwise becoming filled with fluid.

In the expanded state, the landing marker 200 can have a cushioning effect to minimize potential damage to the delivery when it is deposited onto the landing marker 200 and/or minimize potential damage to the UAV when it lands on the landing marker 200. In the unexpanded state, the landing marker 200 can be moved and placed at a location by a user. The location may be transmitted to a UAV or may be determined by inspection of an associated area, such as a location associated with a residential address.

In an unexpanded state, as shown in FIG. 2A, the landing marker 200 takes up a given volume, which is smaller than the volume occupied by the landing marker 200 in an expanded state, as shown in FIG. 2B. The user can place the unexpanded landing marker 200 in a selected or desired location and then the landing marker 200 can be expanded when a UAV is approaching to make a delivery. Once the delivery has been made, the landing marker 200 can be returned to a substantially unexpanded state, such as shown in FIG. 2A. The unexpanded landing marker 200, having a reduced size in the unexpanded state than that of the expanded state, can then be stored and/or moved by the user as desired. The user can retrieve, place and/or prepare the unexpanded landing marker 200 when another UAV delivery is to be made.

In another example, the unexpanded landing marker 200 can be integrated with or designed to appear as or similar to a common object as might be found at the user's location. For example, the landing marker 200 may be formed to look like a rock, a planter, a decorative object, a chair, a table, or other object.

Although example landing marker 200 shown in FIG. 2A in an unexpanded state and FIG. 2B in an expanded state, is substantially cuboid, having an upper surface 202 and a lower surface with intervening side panels 204, other shapes may be used (e.g., circular, polygon, etc.). The interior of the landing marker 200 can define a cavity or volume to receive fluid. The introduction of an expansion fluid to the interior of the landing marker 200 can expand the landing marker 200 from the compact state, such as shown in FIG. 2A to the expanded state, such as shown in FIG. 2B. The lower surface of the marker 200 rests on a surface, such as the ground or a patio, onto which the landing marker 200 is placed. The opposing, upper surface 202 of the landing marker 200 is oriented upwards to receive a delivery from a UAV.

The landing marker 200 can be connected to the controller 210 that can initiate and/or control the expansion of the landing marker 200. The controller 210 can receive a signal or other trigger to expand the landing marker 200, such as a signal from an approaching UAV, from a user device, or a signal transmitted from or through a local source, such as from a user's Wi-Fi system or from a cellular network. The controller can initiate the expansion of the landing marker 200 from an unexpanded state, such as shown in FIG. 2A, to an expanded state, such as shown in FIG. 2B. The controller 210 can also control the deflation and/or reduction of the landing marker 200 from the expanded state. The deflation and/or reduction of the expanded landing marker 200 can include the securement of the deposited delivery.

The landing marker 200 can also include markings, such as 220, that are clearly visible when the landing marker 200 is in an expanded state, as shown in FIG. 2B. The markings 220 can take a variety of forms, shapes and patterns, and can be spread across all or a portion of the upper surface 202 of the landing marker 200. The markings 220 can be interpreted by a UAV to provide information, such as to identify the expanded landing marker 200, indicate a delivery location or orientation of the upper surface of the 202 of the expanded landing marker 200, and/or provide other information that can be visually relayed and/or interpreted by a UAV. Example markings 220 can include a repeating pattern, alphanumeric characters, symbols and other designs, patterns or combinations thereof, which may or may not be unique. In some embodiments, the controller 210 may provide identification information to a UAV, such as via a radio signal or optical signals. For example, the controller 210 may transmit a unique identifier that may enable the UAV to identify the landing marker 200 as a correct landing marker for a particular delivery. The marker 220 may be used to confirm this information or supplement it, for example.

The markings 220 can be formed of various materials having various optical properties, such as a color, a reflectivity and others. The design of the markings 220 and the optical properties of the markings 220 can be used to identify a particular marking 220 of the expanded landing marker 220. The markings 220 can have singular properties or a combination of various properties. The various properties can be indicative of various information which can be received and interpreted by the UAV and its systems. This can include a first portion of the markings having a first property, the first portion of the markings can demarcate the expanded landing marker 200. A second portion of the markings can have a second property and can indicate a targeted point or area of the upper surface 202 upon which the UAV will desirably deposit its delivery onto the expanded landing marker 220. In this manner, various areas or points of the upper surface 202 of the expanded landing marker 200 can be relayed to the UAV to assist with depositing a delivery onto the expanded landing marker 200.

The markings 220 can be integrated with, permanently affixed, or releasably attached to the upper surface 202 of the landing marker 200. Integrated markings can include forming the markings into the upper surface 202 or other portion(s) of the landing marker 200 during manufacture and/or other methods of substantially integrating markings 220 to the landing marker 200. Permanently affixing the markings 220 to the landing marker 200 can include adhering, such as by an adhesive or thermobonding, stitching or other methods of substantially permanently affixing the markings 220 to the landing marker 200. In another example, the markings 220 can be releasably attached to upper surface 202 of the landing marker 200, allowing the markings 220 to be rearranged, modified or changed by a user or other as necessary or desired.

The markings 220 can also include unique information particular to an individual landing marker 200. The unique information can be indicative of one or more users associated with the particular landing marker 200. The UAV can use the unique information of the marking 220 to verify the correct landing marker 200 onto which the delivery is to be deposited. The unique aspect of the markings 220 can be applied to the landing marker 200 by the user or other, such as a manufacturer or supplier. The unique marking can be uploaded to a server or other location queryable by the UAV or its systems. The server can include correlating information allowing the unique markings to be associated with a user and/or location to which deliveries via a UAV can be made.

The markings 220 can further include a transmission capability, such as transmitting a visual signal. A light source, such as a light emitting diode (LED) or laser, can be included in the markings 220. The transmission of a visual signal from the expanded landing marker 200 can assist the UAV with finding, identifying and/or correctly depositing a delivery onto the expanded landing marker 200. The visual signal can include identification of a particular landing marker 200 and/or identification of areas and/or aspects of the expanded landing marker 200, such as a preferred delivery deposition area. The visual signal can include a lighted design, a lighting pattern, such as pattern of light flashing, and other lighting and visual properties. The approaching UAV can receive and interpret the visual signal to assist with the delivery.

The markings 220 of a landing marker, such as 200, can also be customizable by a user. A user can design a customized marking 220 design that is then associated with the user and can be applied by the user to the landing marker 200. The customized markings 220 can also be applied to the landing marker 200 by a manufacturer or supplier so that the user receives the landing marker 200 with the customized markings 220 applied.

Figure 3A:
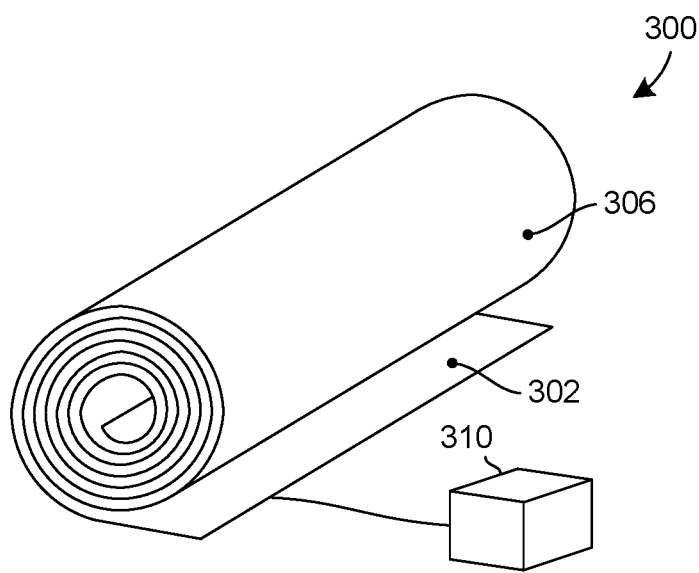
FIGS. 3A and 3B are perspective views of another example UAV landing marker of a UAV expandable landing marker system in an unexpanded state and an expanded state.
Figure 3B:
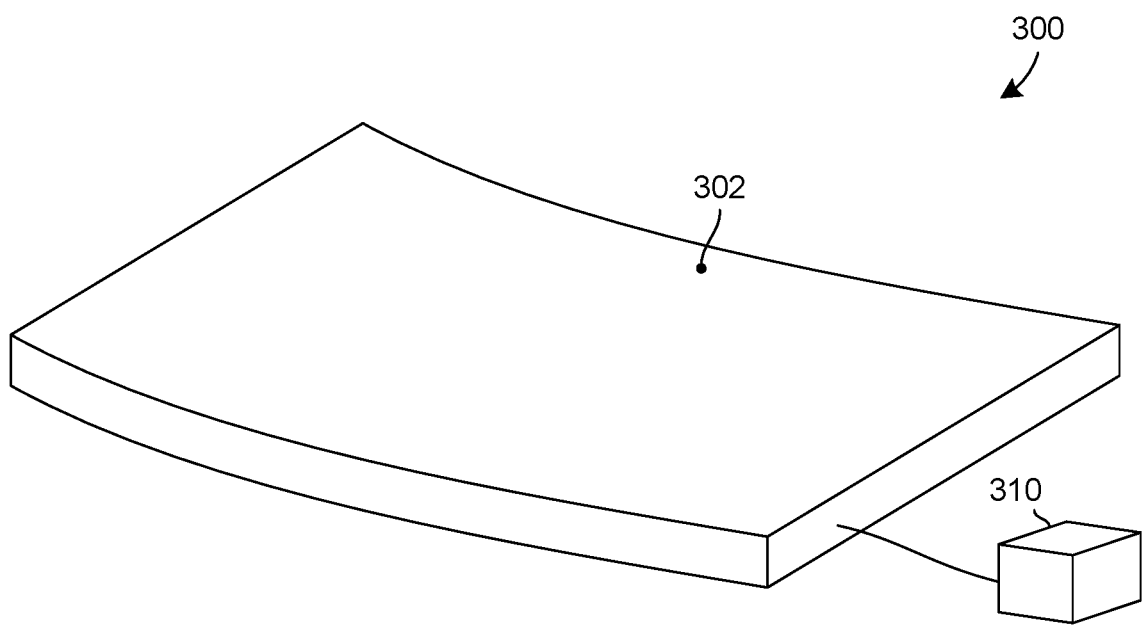

FIGS. 3A and 3B are perspective views of a further example landing marker 300 in an unexpanded state, FIG. 3A, and an expanded state, FIG. 3B. The landing marker 300 has an unexpanded state that is substantially the unexpanded landing marker 300 rolled about itself, as shown in FIG. 3A. When an expansion fluid is introduced into the unexpanded landing marker 300 of FIG. 3A, the landing marker 300 expands to an expanded state, as shown in FIG. 3B. As with the example landing marker 200 of FIG. 2B, the expanded landing marker 300 may be a substantially cuboid shape, as shown in FIG. 3B or another shape.

The landing marker 300 of FIGS. 3A and 3B includes an upper surface 302 upon which a delivery can be deposited and a lower surface 306 that is proximal a supporting surface, such as the ground or a patio, when the landing marker 300 is in an expanded state, such as shown in FIG. 3B. In the unexpanded state, such as shown in FIG. 3A, the upper surface 302 and the lower surface 306 of the unexpanded landing marker 300 are in proximity and/or contacting each other due to the rolled nature of the unexpanded landing marker 300.

The landing marker 300 may be formed of a material that retains a certain shape or configuration when unexpanded, such as a rolled up or spooled shape. For example, some materials have shape "memory" and may return to a particular shape or position after a force being applied to the material (e.g., a force caused by filling an internal volume with fluid) is discontinued, allowing the material to resume a prior shape (e.g., rolled up, etc.). Certain rubber materials, plastic materials, and other materials can be designed to retain a predetermined shape.

Figure 9A:
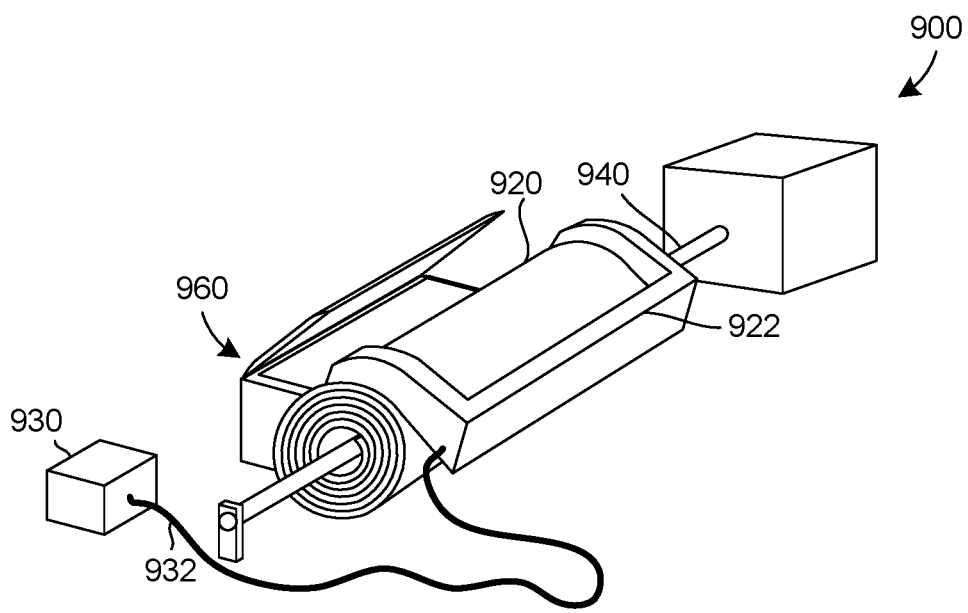
FIGS. 9A-9C arm perspective views of a UAV expandable landing marker system including a UAV marker in an unexpanded and an expanded state, where the UAV expandable landing marker system is configured to retract and move an item from a deposited location.
Figure 9B:
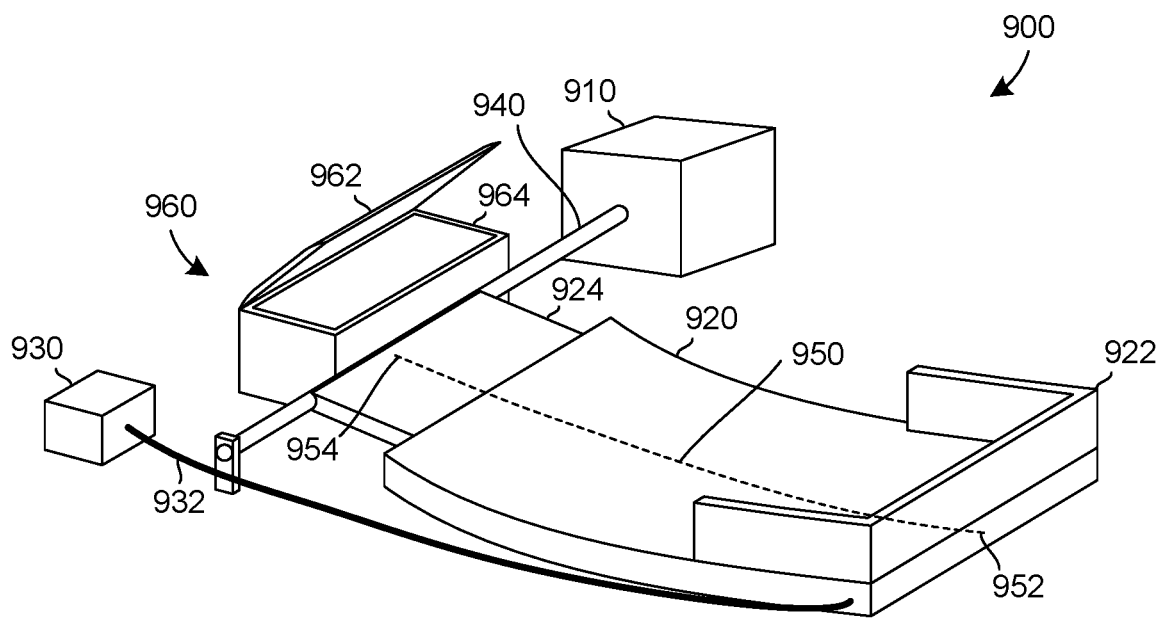

In the unexpanded state, such as shown in FIG. 3A, the landing marker 300 can be rolled up or rolled about a rotatable central shaft that extends through the center of the rolled unexpanded landing marker 300. When a shaft is used, the landing marker 300 can also be further affixed to the rotatable central shaft to assist with the deployment and/or retraction of the landing marker 300. Additionally, the rotatable central shaft can also be used to introduce an expansion fluid to expand the landing marker 300. However, the landing marker 300 may be deployed with or without the shaft. An example shaft is shown in FIGS. 9A and 9B.

As the landing marker 300 expands, it can begin to unroll or deploy due to the introduction of an expansion fluid into at least a portion of an interior space or volume of the landing marker 300. If included, the rotatable central shaft can be rotated to also assist with the deployment of the landing marker 300 by unrolling the landing marker 300. During deflation/reduction of the landing marker from the expanded state to an unexpanded state, rotation of the rotatable central shaft can retract and reroll the landing marker 300 about the rotatable central shaft to return the landing marker 300 to an unexpanded state, such as shown in FIG. 3A.

FIGS. 4A-4D illustrate example anchors for preventing movement of a landing marker 400 in an expanded state. In an expanded state, the landing marker 400 can be subject to various environmental conditions, such as wind, the anchors assist in keeping the expanded landing marker 400 substantially in a single position. A moving, expanded landing marker 400 can increase the difficulty of successfully depositing a delivery onto the expanded landing marker 400. Further, if not anchored, the expanded landing marker 400 can be caught and/or moved by the wind, causing the expanded landing marker 400 to be lifted off of the ground or a surface and it could potentially strike and interfere with the delivery UAV. Also, when the UAV approaches the expanded landing marker 400, a downward wash from the UAV propulsion system(s) can cause the expanded landing marker 400 to move and/or deform if not properly anchored. As previously discussed, this motion could potentially interfere with the delivery UAV and/or increase the difficulty of the delivery which could cause compromise the delivery.

Figure 4A:
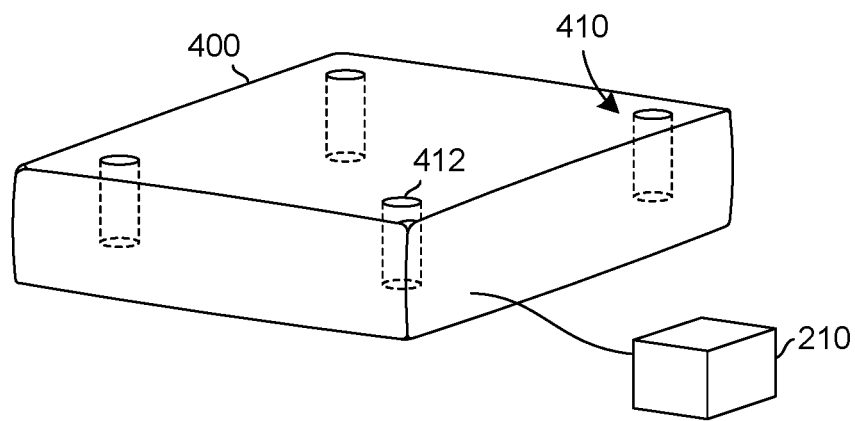
FIGS. 4A-4D are perspective views of example anchors of a UAV expandable landing marker system.

FIG. 4A is an example anchor system 410 that is integrated into the landing marker 400, which is shown in an expanded state. The anchor system 410 includes one or more cavities or wells, 412 that extend into the interior of the landing marker 400. A weighted material and/or object can be placed into the wells 412 of the expanded landing marker 400 to weigh it down, or anchor it in a location. The weighted material placed in the wells 412 can include found objects from the surrounding environment, such as stones, dirt, water, which can ballast the expanded landing marker 400. Other weighted object that can be placed in the wells 412 can include metallic weights and/or weights constructed of other suitable material(s), including fluid filled containers. In a further example, the wells 412 can be filled with a fluid, such as water. The weighted material and/or objects placed in the wells 412 of the expanded landing marker 400 increase the overall weight of the expanded landing marker 400. The increased weight of the expanded landing marker 400 can prevent motion of the expanded landing marker 400 due to external environmental forces, such as wind and wash from the UAV. The weighted material and/or objects can be removed or emptied from the wells 412 of the expanded landing marker 400 before deflating/reducing the landing marker 400 to an unexpanded state. In the example using a fluid as a weighted material, the deflation/reduction of the expanded landing marker 400 can empty the wells 412, due to their collapse as the landing marker 412 is deflated/reduced, allowing the fluid to empty from the wells 412. The weighted objects can be removed and stored for later use and/or returned to the surrounding environment from which they were acquired.

Figure 4B:
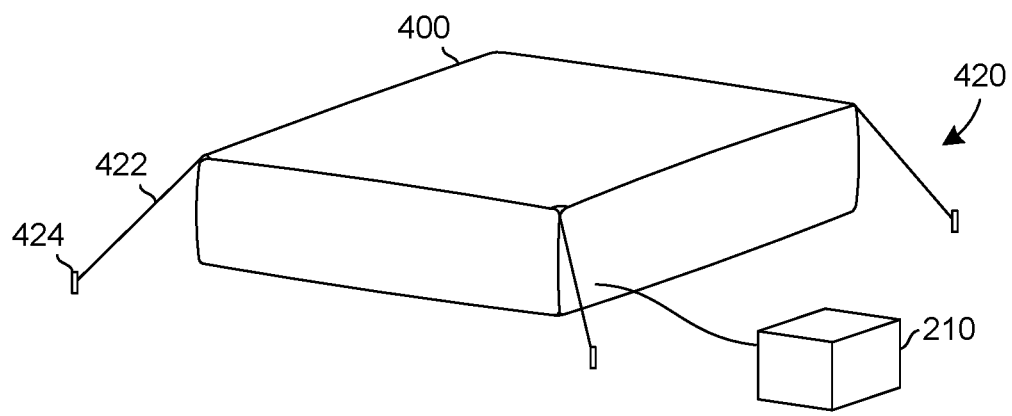

FIG. 4B is a further example anchor system 420 for restraining movement of the expanded landing marker 400. The anchor system 420 uses a series of tethers 422 which are affixed to tie-downs 424. The tie-downs 424 are affixed to or embedded into the surrounding surface, such as the ground, about the expanded landing marker 400. The tie-downs can be permanently or temporarily affixed to or embedded into the surrounding surface. An example tie-downs can include stakes, such as tent stakes, that are driven into the ground. The tie-downs can be left in place for subsequent use with the expanded landing marker 400, or can be removed and reinstalled as necessary. The tethers 422 can be permanently or releasably attached to the landing marker 400. In the example of FIG. 4B, the tethers 422 are shown positioned at the corners of the expanded landing marker 400, however, the tethers 422 can be positioned along any side of the landing marker 400, including extending across or through the landing marker 400. Further, although four tethers 422 are shown for illustrative purposes, the number of tethers 422 used to secure the expanded landing marker 400 can vary. The tethers 422 can also include adjustment means allowing the tether 422 to be lengthened or shortened. The tethers 422 can be rigid, flexible or semi-flexible in nature. In an example, the landing marker 400 can include fastening points, such as loops or snaps, that can be engaged by a connector of the tether 422 to connect the tether 422 and the landing marker 400. An opposite end of the tether 422 can include a second connector that can engage a connector or a tie-down 424 directly to connect the tether 422 and the tie-down 424. The interconnected expanded landing marker 400, tether(s) 422 and tie-down(s) 424 server to anchor the expanded landing marker 400 in a substantially fixed location and/or orientation in preparation for deposit of a delivery by a UAV.

Figure 4C:
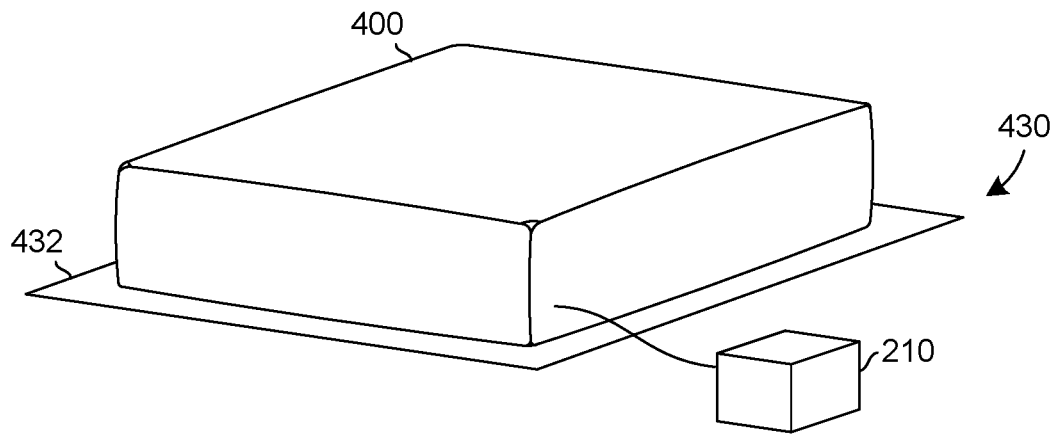

FIG. 4C is a further example anchor system 430 that is integrated with the landing marker 400. The anchor 430 includes additional material, or fringe, 432 about a periphery of a lower surface of the landing marker 400. Weights, such as found objects, fluid filled objects, or other objects, can be placed on fringe 432 to weigh down the landing marker 400. The weight on the fringe 432 can assist in maintaining the landing marker 400 in substantially the same position. In some embodiments, the fringe 432 may be formed of a heavy material, such as a thick or heavy rubber or other material that acts as a weight to secure a position of the landing marker 400.

The fringe 432 can be formed as part of the lower surface of the marker 400, formed separately and attached about the periphery of the lower surface of the marker 400, or otherwise attached to and/or integrated with the landing marker 400. In other examples, the fringe can be attached to and/or integrated with the landing marker 400 at a location(s) other than about the periphery of the lower surface and provide area such that weights can be placed on the fringe 432. The fringe 432 can take many forms, shapes and/or profiles. Further, the fringe 432 can be continuous about a periphery of the landing marker 400, as shown in FIG. 4C, or can be discontinuous about a portion or portions of a periphery of the landing marker 400.

Figure 4D:
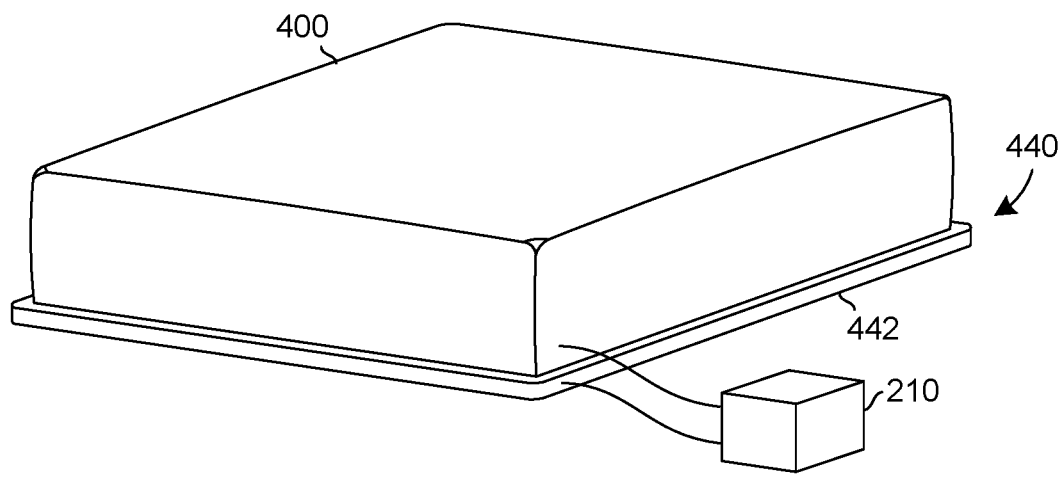

FIG. 4D is a further example anchor system 440 that includes a second cavity 442. The second cavity 442 may be formed as a tube about the periphery of the lower surface of the landing marker 400, may form a side or base of the landing marker 400, or many have another shape. The second cavity 442 can be integrated with or affixed/attached to the landing marker 400. The second cavity 442 is at least partially hollow, forming a second volume that is separate from the first, interior volume of the landing marker 400. This allows the second volume of the second cavity 442 to be filled with a second expansion fluid that can be the same as or different from the expansion fluid that is used to expand the landing marker 400. In the example shown in FIG. 4D, the landing marker can include a gaseous expansion fluid, such as air, and the second cavity 442 can include a denser expansion fluid, such as liquid water. The denser expansion fluid of the second cavity 442 adds weight to the landing marker 400, assisting in preventing substantial movement of the landing marker 400. The expansion fluid placed in the second cavity 442 can be placed and emptied from the second cavity 442, such as through a valve or sealable opening, as necessary or desired. During storage of the landing marker 400, it can be desirable to empty the expansion fluid of the second cavity 442 to reduce the weight and assist with compacting the landing marker 400 to a smaller, compact form that is easier for storage. Additionally, the second cavity 442 can be releasably connected to the landing marker 400, such that the second cavity 442 can be placed around the landing marker 400 in an expanded state and removed before, during or after reducing the landing marker 400 to a compact or unexpanded state.

In a further example, the second cavity 442 can be continuous about the lower surface of the landing marker 400, as shown in FIG. 4D, or it can include other shapes and/or profiles, such as it can be discontinuous and/or divided into portions. The various portions of the second cavity 442 can be interconnected, allowing fluid communication between the various portions of the second cavity 442. The fluid communication between the various portions of the second cavity 442 can allow the expansion fluid to be introduced to the various portions from a single inlet, and vice versa, empty the expansion fluid through the same single inlet or another one or more outlets.

In further examples, a portion of the second cavity 442 can extend fully or partially across the lower surface of the landing marker 400. The additional second volume of the second cavity 442 can further assist with weighing down the landing marker 400 to prevent movement of the landing marker 400 in an expanded state. In an example, the second cavity 442 can extend fully across the lower surface of the landing marker 400 and can extend past the periphery of the landing marker 400 or can be bound by the periphery of the landing marker 400. In another example, the second cavity 442 can include one or more channels or conduits which span across a portion of the lower surface of the landing marker 400 and can connect to other portions of the second cavity 442. Further, the second cavity 442 can include portions which extend into the interior of the landing marker 400, but are separated from the internal, first, volume of the landing marker 400.

Figure 5:
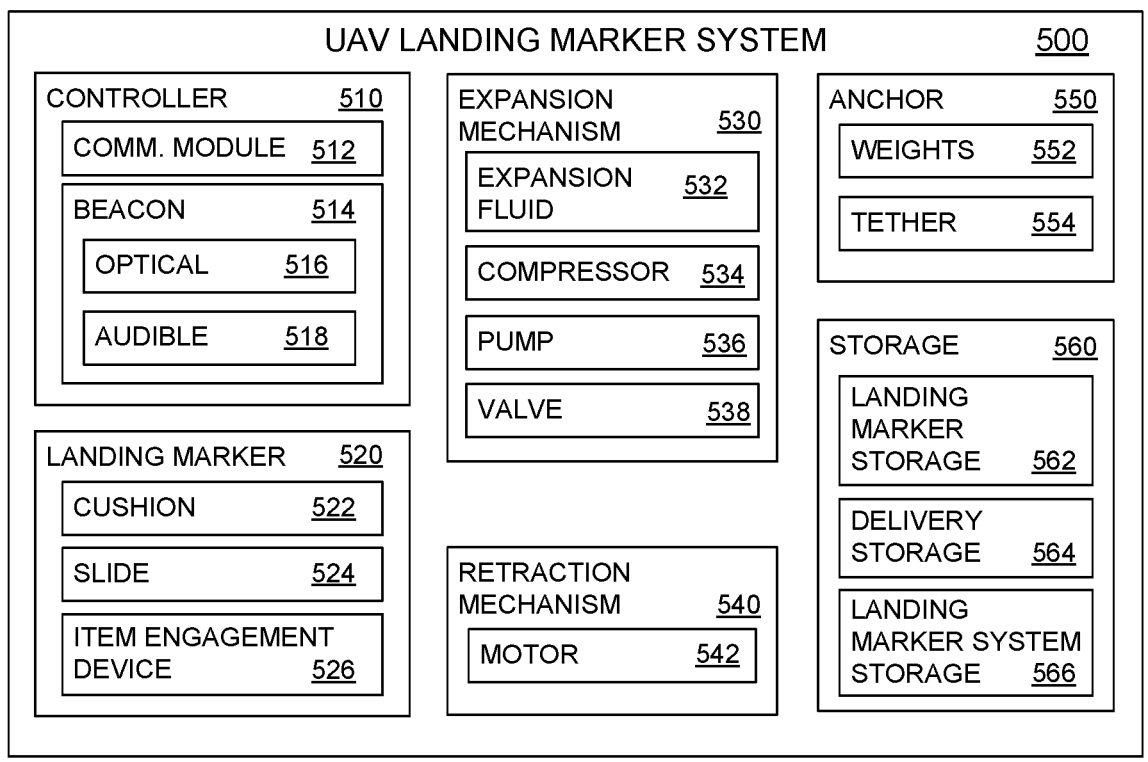
FIG. 5 is a block diagram of an example UAV expandable landing marker system.

FIG. 5 is a block diagram of an example UAV expandable landing marker system 500. The UAV expandable landing marker system 500 can include a controller 510, a landing marker 520, an expansion mechanism 530, a retraction mechanism 540, an anchor 550 and/or storage 560. The UAV expandable landing marker system 500 deploys the landing marker 520, which can receive a UAV delivered package or the UAV and package. The deployment of the landing marker 520 can be controlled by the controller 510 to deploy the landing marker 520 in response to a trigger, such as a signal received from an approaching UAV. The landing marker 520 can be stored in an unexpanded state and expanded using an expansion mechanism 530 to expand the landing marker 520 to an expanded, or deployed, state. The anchor 550 can add weight to the landing marker 520 to assist in preventing motion of the deployed landing marker 520. Once the delivery has been made, the landing marker 520 can be deflated or retracted by a retraction mechanism 540 to reduce the deployed landing marker 520 to an unexpanded state. The retraction of the landing marker 520 can include the storage 560 of the reduced/unexpanded landing marker 520 in a landing marker storage 562. In some embodiments, the delivered package can be stored, including moving or manipulating the package to a delivery storage 564 where the package can be stored.

The controller 510 can include a communication module 512 and a beacon 514. The controller 510 can control all or portions of the various UAV expandable landing marker system 500 components, such as the landing marker 520, the expansion mechanism 530 and retraction mechanism 540. The controller 510 can also include or be connected to various sensors of the UAV expandable landing marker system 500 to assist with control of the UAV expandable landing marker system 500.

The communication module 512 can facilitate communication between the UAV expandable landing marker system 500 and other systems, networks and other communicable elements, such as a UAV, a user device, and/or a home network device. Various communications may be performed, such as via radio transmissions, Bluetooth® and/or Wi-Fi communications, cellular communications, wide ara networks (WANs) and others, can be used by the communication module 512. Additionally, the communication path between the communication module 512 and another system or element can be done through multiple communication means, intervening elements and/or systems. Further, the communication module 512 can communicate with multiple systems and/or elements. The communications may be used to determine when to expand and/or retract/deflate the landing marker. The communications may sense receipt of an item, such as by a measured change in pressure of the landing marker, which may be used to alert a consumer of receipt of the item via a communication from the controller 210. In some embodiments, the communications may identify the landing marker to a UAV, such as by providing an identifier to the UAV that is associated with the particular landing marker. This information may be used in addition to visual indicators on the landing marker that may identify the landing marker or a unique landing marker associated with a particular location. By using this information, the UAV may distinguish between different landing markers even when the landing markers are in close proximity, such as at adjacent residences and just yards away from one another.

In an example, the communication module 512 can communicate directly with the approaching UAV to receive communications regarding the approaching UAV, uniquely identify the landing marker 520 to the UAV and to deploy the landing marker 520. In another example, the communication module 512 can communicate with a local network, such as a residential Wi-Fi network, to receive communications from the approaching UAV, which may act as a trigger to cause inflation or expansion of the landing marker.

The controller 510 can also include the beacon 514. The beacon 514 can include an optical beacon 516 and/or an audible beacon 518. The beacon 514 can emit a signal that the approaching UAV can detect to communicate with the UAV, such as assisting with determining the relative position of the UAV and the landing marker 520 in an expanded or deployed state. The UAV expandable landing marker system 500 and/or controller 510 can include multiple beacons 514 placed in various locations on and/or around the UAV expandable landing marker system 500 and/or its various components, elements and systems. The multiple beacons 514 can be used to delineate portions of the UAV expandable landing marker system 500, such as the landing marker 520 in a deployed state. Additionally, the beacon 514 can also communicate with a user to indicate various statuses of the UAV expandable landing marker system 500 and/or its components and/or systems, such as an operative status, a delivery status, a warning and/or a failure.

The optical beacon 516, such as a light, can flash and/or move in a repeated pattern or manner that the approaching UAV can detect. The flashing and/or movement of the optical beacon 516 can also be modified depending on the relative position of the UAV and the landing marker 520 as determined by the UAV expandable landing marker system 500. Additionally, the optical beacon 516, flashing pattern, arrangement and/or color can be unique to a specific UAV expandable landing marker system 500, or user of the system 500. The unique optical beacon 516 can be detected by the UAV and used to identify the landing marker 520 and/or landing marker system 500 as the correct one for the UAV delivery. The optical signal emitted by the optical beacon 516 can be within the visible light spectrum and/or can be emitted outside of the visible light spectrum, such as an infrared emission.

The audible beacon 518 can emit an audible signal, such as a constant tone, a patterned or other tone and/or audible signal. The emitted audible signal can be of a frequency and/or intensity detectable by a human, such as the user, or can be outside of this scale, such as an ultrasonic signal. The UAV can detect the emitted audible signal to determine, much like the optical beacon 516, the position, relative or otherwise, of a deployed landing marker 520. As with the optical beacon 516, the audible signal 518 can also communicate with a user to indicate various information regarding the UAV landing system 500 and/or its components/ systems. Further, as like the optical beacon 516, the signal emitted by the audible beacon 518 can be unique to the specific UAV expandable landing marker system and/or delivery recipient. The UAV can detect the unique signal to identify and/or verify the landing marker 520 and/or UAV expandable landing marker system 500.

The landing marker 520 may include a material structure that can receive a fluid to expand in size in anticipation of receipt of the UAV delivery and/or the UAV and delivery. The material structure may include an internal volume to receive and store, at least temporarily, a fluid. The landing marker 520 can be deployed in response to the approaching UAV and/or other signal/communication from the controller 510 or other component/system. Deploying the landing marker 520 can include expanding the landing marker 520 from an unexpanded to an expanded state. During periods of non-use, the landing marker 520 can be stored in a landing marker storage 562.

The landing marker 520 can take multiple various forms, profiles, designs materials and/or combinations thereof. In an example, the landing marker 520 can include a cushion, or cushion portion, 522 that can receive the delivery and/or UAV. The cushion landing marker 522 can decelerate the received delivery and/or UAV to assist in preventing damage to the delivery and/or UAV. In another example, the landing marker 520 can include a slide, or slide portion, 524 that can receive the delivery and/or UAV. The slide landing marker 524 can decelerate the received delivery and/or UAV to assist in preventing damage to the delivery and/or UAV. Additionally, the slide landing marker 524 can provide a surface over which the received delivery can move, the slide-nature of the slide landing marker 520 directing the received delivery to a desired portion of the UAV expandable landing marker system 500.

The landing marker 520 can have varied profiles, forms and/or shapes. The shape of the landing marker 520 can include aesthetic and/or functional consideration, such as based on the location of the UAV expandable landing marker system 500, an expected size and/or mass of a delivery and various other considerations. In the previously presented illustrated examples such as FIGS. 4A-4D, the landing maker 520 is shown substantially cuboid. In other examples, the landing marker 520 can include other various shapes, profiles and/or forms, such as cylindrical, spherical, and/or combinations of shapes, profiles and/or forms. In another example, the shape of a landing marker 520 can include a branded commercial design, such as a logo for advertising.

In some embodiments, the landing marker 520 may include an item engagement device 526 to enable moving the item deposed on the lander marker 520 during retraction of the landing marker. For example, the landing marker 520 may be rolled up and may drag an item from a first location to a second location during the rolling up of the location marker. The item engagement device 526 may be configured to retain, at least temporarily, the item during the retracting of the landing marker. The item engagement device 526 may also protect the item from environmental factors, such as by covering the item.

The landing marker 520 can be constructed of one or more materials using various construction techniques. The various surfaces, such as a lower surface, upper surface, side panels and interior surface(s), of the landing marker 520 can include one or more materials and/or layers of materials, such as multi-layered portions for reinforcement and/or strength. The exterior surfaces of the landing marker 520 can be constructed of different materials, such as the lower surface constructed of a durable, abrasion resistant material since the lower surface will be in contact with a surface and may move relative to the surface. An upper surface of the landing marker 520 can be constructed of an elastic material to assist with decelerating a received delivery. Material used to form the expandable volume of the landing marker 520 can have properties to assist in preventing the leakage of the expansion fluid through the material and/or reduce the leakage of the expansion fluid through the material.

The expansion mechanism 530 can be connected to and/or integrated with the landing marker 520 to expand the landing marker 520 from an unexpanded state to an expanded state, the expanded state of the landing marker 520 being larger than the unexpanded state. The expansion mechanism 530 can include an expansion fluid 532.

The expansion fluid 532 can include a gas, such as air, and/or a liquid, such as water. Air and water can be a convenient expansion fluid 532 due to their wide availability. The expansion fluid 532 can be introduced into an interior volume, or portion of the interior volume, of the landing marker 520. The pressure and/or volume of the introduced expansion fluid 532 can be varied to allow a changeable stiffness and/or rigidity of the landing marker 520 in an expanded state.

The gaseous expansion fluid 532, such as air, can be introduced into the interior volume, or portion(s) thereof, of the landing marker 520 by compressor 534, such as an air compressor a device storing compressed gas. Air from the device and/or reservoir can be introduced to the interior volume, or portion(s) thereof, to expand, or inflate, the landing marker 520 to an expanded state. The compressor 534 can be in fluid communication with the landing marker 520 to introduce air upon receipt of a command from the controller 510 or can be manually connected and/or actuated to inflate the landing marker 520, or portion thereof, with air or another fluid.

In some embodiments, the expansion mechanism may include a pump 536. The pump may be electrically driven or human operated. The pump 536 may be a foot or hand operated air pump that can be actuated by a user to inflate the landing marker 520. In another example, a motorized air pump can be connected to the landing marker 520 and when triggered or signaled by the controller 510 can begin inflating the landing marker 520 to an expanded state.

The expansion mechanism 530 may include a valve (or vent) 538 to control inflow of fluid into the landing marker and/or outflow of fluid out of the landing marker. Actuation of the reservoir can be a manual, user actuated process or can be an automatic process triggered by the controller 510. The valve 538 may be electronically controlled by the controller 510 to enable opening or closing of the valve 538 at specific times or in response to triggers. The valve may be a manual valve. For example, the user can actuate a reservoir of compressed gas, such as a $CO_2$ or compressed air tank, to inflate the landing marker 520, which may be released by actuation of the valve 538. In a further example, a combination of controller 510 and user interaction can expand the landing marker 520 to an expanded state. The trigger 510 can signal to a user to inflate the landing marker 520 with air in preparation for a delivery.

The liquid expansion fluid 532, such as water, can be introduced into the interior volume, or portion(s) thereof, of the landing marker 520 by a manual or automatic process using the pump 536 and/or the valve 538. The controller 510 can signal the pump 536 and/or the valve 538 of the UAV expandable landing marker system 500 to inflate or expand the landing marker 500 with water 536. Water can be introduced into the landing marker 520 through an inlet of the landing marker 520. The inlet can be releasable or permanently connected to a water source, such as a hose, pump, water reservoir or other water source. The water source can supply the water that is transferred into an interior volume, or portion(s) thereof, of the landing marker 520. The water may fill the interior volume, or portion(s) thereof, of the landing marker 520 to expand the landing marker 520 to an expanded state.

In an example, the landing marker 520 can be expanded using a combination of expansion fluids 532, such as a mix of air and water. The combined expansion fluids 532 can be introduced into the same interior volume, or portion(s) thereof, of the landing marker 520 or can be introduced into separated interior volumes, or portion(s) thereof, of the landing marker 520. The use of water, or a liquid or dense gas, as an expansion fluid 532, or portion thereof, can add weight to the expanded landing marker 520 to assist with anchoring the landing marker 520 in a substantially fixed location.

After the delivery has been received, the expanded landing marker 520 can be reduced to an unexpanded state. The landing marker 520 in an unexpanded state can occupy less room and/or volume than the landing marker 520 in an expanded state, allowing the unexpanded landing marker 520 to be more easily stored and/or managed. To reduce the landing marker 520 to an unexpanded state, the expansion fluid 532 can be drained, or otherwise emptied, fully or partially, from the interior volume, or portion(s) thereof. The removed expansion fluid 532 can be recycled for reuse in a future landing marker 520 expansion process or can be disposed of. In the example of air as an expansion fluid, the air can be allowed to simply escape through the valve 538, one or more controllable outlets, or openings, of the landing marker 520. In the example with water as the expansion fluid 532, the water can be drained through one or more controllable outlets, or openings, of the landing marker 520. The drained water can be used to water a surrounding environment, such as a lawn or garden. Additionally, the outlet of the landing marker 520 can be connected to a hose or other conduit, to allow the drained expansion fluid 532 to be directed to a desired location.

In some embodiments, the expansion mechanism 530 can include a mechanical mechanism. The mechanical expansion mechanism can include an extending and/or expandable portion, such as a frame, that interfaces with the landing marker 520. As the mechanical expansion mechanism is extended and/or expanded, it can expand and/or assist in expanding the landing marker 520 to an expanded state. The mechanical expansion mechanism can expand the landing marker 520 to an expanded state alone and/or in conjunction with an expansion fluid 532. In an example, the mechanical expansion mechanism can include a pantograph that can compress in a reduced state and extend to expand the landing marker 520. In another example, the mechanical expansion mechanism can include a linear actuator and/or screw drive that can be used to extend and/or expand an engaged landing marker 520. In a further example, the mechanical expansion mechanism can include springs, such as mattress springs that are disposed interior the landing marker 520. In a stored or unexpanded state, the mattress springs of the landing marker 520 are compressed, reducing the size and/or volume of the landing marker 520. To deploy and/or expand the landing marker 520, the springs are allowed to decompress, thereby expanding the landing marker 520.

The landing marker 520 of the UAV expandable landing marker system 500 can be reduced from an expanded state to a reduced or unexpanded state by reducing an expansion mechanism 530, such as by deflating or removing an expansion fluid 532 from the landing marker 520. In addition to reducing the landing marker 520, the UAV expandable landing marker system 500 can include a retraction mechanism 540 that can retract the landing marker 520 and/or return the landing marker 520 to substantially an original size, shape, position and/or state, as the landing marker 520 was in prior to being deployed and/or expanded. The retraction mechanism 540 can compress and/or otherwise reduce the expanded landing marker 520 to an unexpanded state. The retraction mechanism 540 can include one or more components, elements and/or systems that can engage one or more components, elements and/or systems of the UAV expandable landing marker system 500 to reduce the landing marker 520.

An example retraction mechanism can include a motor 542 that can be electrically or other powered to retract the landing marker 520, the landing marker 520 can be in an expanded or a reduced state, such as a previously expanded landing marker substantially emptied of an expansion fluid 523. The motor 524 can engage or interface with the landing marker 520 and when actuated can retract the engaged landing marker 520. In an example, the motor 542 can include a rope that has a first end attached to the interior of a side surface of the landing marker 520 and a second end attached to a rotating axle (or shaft). Upon actuation, such as by the controller 510, the axle can be rotated by the motor 542 to retract the rope and by the connection at the first end of the rope, the landing marker 520. Another example can include a shaft to which a portion, such as a side, of the landing marker 520 is attached or otherwise engaged. The rotation of the shaft can roll-up the landing marker 520.

As described above, some materials may retain their shape a force is removed from the material (e.g., after deflation) or possibly in response to an input (e.g., a current applied to the material). Another example retraction mechanism 540 can include a mechanical retraction mechanism. The mechanical retraction mechanism can store mechanical energy that, when released, causes the retraction of the landing marker 520. The mechanical retraction mechanism can store energy from the expansion of the landing marker 520, and when actuated, such as by the controller 510, release the stored mechanical energy to retract the landing marker 520. An example mechanical retraction mechanism can include a rotatable shaft connected or engaged with the landing marker 520 and a coil spring. As the landing marker 520 is deployed or expanded from the rotatable shaft rotating in a first direction, the coil spring stores a portion of the energy of the rotating shaft. When actuated, that coil spring can release the stored energy causing rotation of the rotatable shaft in a second direction opposite the first direction. Other example mechanical retraction mechanisms 520 can include a counterweight system, a pneumatic tube, springs and other mechanical energy storage mechanisms. In a further example, the discharging expansion fluid 532 from the landing marker can engage a turbine to or fan to cause rotation of a shaft that engages at least a portion of the landing marker 520 directly or indirectly.

A further example retraction mechanism 540 can include a pressure differential retraction mechanism such as a pump that removes the expansion fluid 532 from the landing marker 520 and/or reduces an interior volume of the landing marker 520 to reduce and/or retract the landing marker 520. For example, the compressor 534 and/or the pump 536 may be reversed in operation by the controller 510 to cause the component(s) to operate as retraction mechanism 540.

The UAV expandable landing marker system 500 can also include an anchor 550 that can engage an expanded landing marker 520 to prevent, or assist in preventing, substantial movement of the expanded landing marker 520 relative to a surface upon which the expanded landing marker 520 has been expanded, placed, deployed, or otherwise located. The anchor 550 can include one more components, elements and/or systems that can engage or interface with the landing marker 520 to reduce and/or limit motion of the expanded landing marker 520.

An example anchor 550 can include weights 552, such as a fluid weight, like water, and/or objects that can be added to the landing marker 520, automatically and/or manually, to anchor the landing marker 520 in an expanded state. The various weight anchors 552 can be placed directly on or otherwise engaged with the landing marker 520 to prevent motion of an expanded landing marker 520.

The object anchor(s) can include specific weights and/or can include found objects, such a rocks or other objects found near a location for deploying or expanding the landing marker 520. The weight anchor(s) can be stored with a stored landing marker 520 or otherwise stored for use with the landing marker 550. A found object weight anchor(s) can be stored or returned to the environment or location, such as where they were originally acquired from.

The water anchor can include water added to one or more portions of a landing marker 520 or water filled objects or containers which are then placed on or engaged with the landing marker 520 to prevent or reduce motion of the landing marker 520 in a deployed or expanded state. The water anchor can be filled from a water source, such as a residential hose pipe, or can be sealed in a container so that the water anchor can be used repeated times.

Another example anchor 550 can include a tether(s) 554 that can be affixed to the landing marker 520 and a stable point external the landing marker 520. The tether can be a rope or other pliable or rigid material that links the landing marker 520 and a stable point. The affixed tether 554 can prevent motion of an expanded landing marker 520 in relation to the ground or surface upon which the landing marker 520 is deployed or expanded. Multiple tethers, each connected to a point on the landing marker and one or more stable points, such as a tent stake placed in the ground, can be used to restrain and/or reduce motion of an expanded landing maker 520. Various numbers of tethers, tether materials, affixed landing marker 520 points and stable points can be used to restrain and/or reduce motion of an expanded landing marker 520.

The UAV expandable landing marker system 500 can also include storage 560 that can include landing marker storage 562, delivery storage 564 and/or landing marker system storage 566. The storage 560 can reduce the visual and/or spatial impact of the UAV expandable landing marker system 500 and/or its various components, elements and/or systems when the UAV expandable landing marker system 500 is not in use and/or when the system 500 is in use. Additionally, the storage 560 can provide security and/or protection of the various components, elements and/or systems of the UAV expandable landing marker system 500 and/or a delivery received by the system 500.

Landing marker storage 562 can include storing the landing marker 520 when not in use, such as in an unexpanded or reduced state. When the landing marker 520 is required, the landing marker 520 can be removed manually or automatically from the landing marker storage 562 or the landing marker 520 can be deployed directly from the landing marker storage 520. After the landing marker 520 has received a delivery or is no longer required, the expanded landing marker 520 can be reduced to an unexpanded state and/or retracted, such as by a retraction mechanism 540, into the landing marker storage 562 for reuse. To assist with minimizing the visual impact of the unexpanded and/or stored landing marker 520, the landing marker storage 562 can include various profiles, shapes, colors, designs and/or other considerations to disguise or obscure the landing marker storage 562, such as appearing as a normal object found at the location of the landing marker storage 562. An example landing marker storage 562 having a reduced or minimal visual impact is a landing marker storage 562 that appears as a pot or other landscaping feature as might be found in an outdoor residential setting.

The delivery storage 564 can include a location in which a received delivery can be stored or moved to for retrieval by user or recipient. The received delivery can be moved into the delivery storage 564 by the retraction of the landing marker 520, such as by a retraction mechanism 540. The delivery storage 564 can include a position on the unexpanded landing marker that can be retracted about the received delivery, thereby shielding and/or protecting the received delivery. The delivery storage 564 can secure the received delivery to prevent tampering or theft by a person other than the UAV expandable landing marker system 500 user and/or a delivery recipient. The delivery storage 564 can include various considerations for preventing damage to the received delivery, such as water/weatherproofing, security features and/or other considerations, to assist in protecting the integrity of the delivery until retrieved by a user and/or recipient. As with the landing marker storage 562, the delivery storage 564 can be designed and/or constructed to reduce a visual impact of the delivery storage 564 in the environment in which the UAV expandable landing marker system 500 is to be used.

The landing marker system storage 566 can store one or more components, elements and/or systems of the UAV expandable landing marker system 500. The landing marker system storage can include the landing marker storage 562 or can be separate from but connected to the landing marker system storage 562 to facilitate automatic and/or manual deployment of the landing marker 520. Further, the landing marker system storage 566 can include a portion that is the delivery storage 564. As with the other storages 562, 564, the landing marker system storage 566 can include considerations to reduce and/or minimize the visual impact of the landing marker system storage 566 in relation to a surrounding environment in which the landing marker system storage 566 is placed and/or used.

Figure 6:
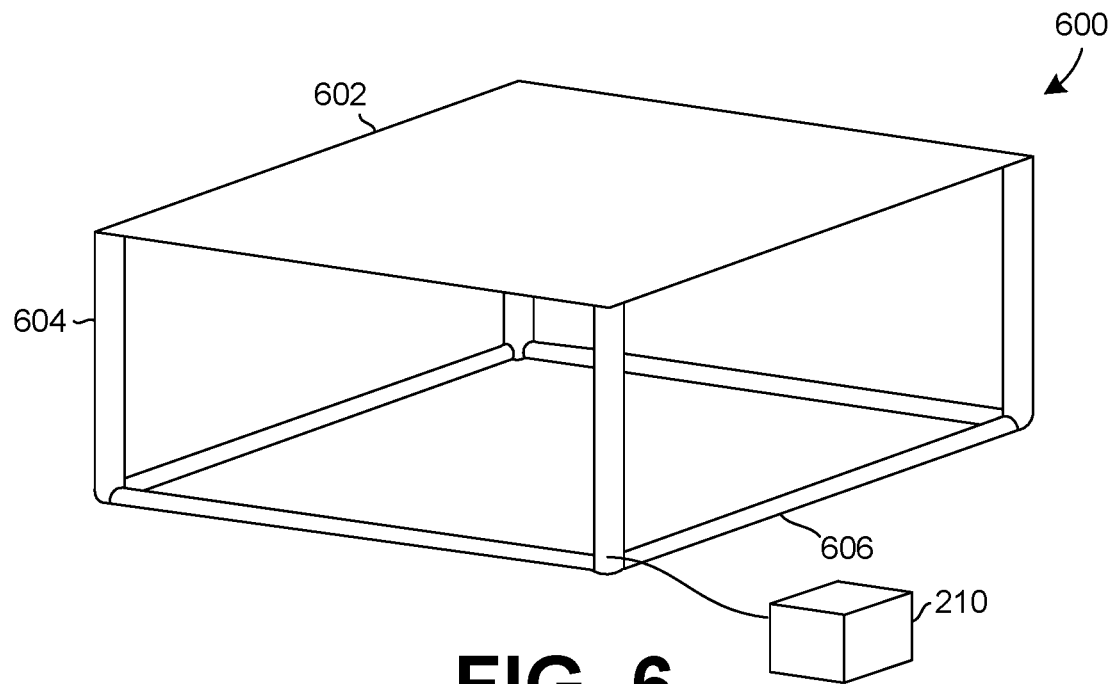
FIG. 6 is a perspective view of a further example UAV expandable landing marker that includes expandable columns.

FIG. 6 is a perspective view of an example landing marker 600. The landing marker 600 includes an upper surface 602 upon which a delivery item and/or UAV can be received. The upper surface 602 is supported by inflatable, or expandable columns 604 that extend between the upper surface 602 and a surface upon which the landing marker 600 rests. The columns 604 can be interconnected by sections 606. When a delivery and/or UAV is received on the upper surface 602 of the landing marker 600, the weight of the delivery and/or UAV can cause the inflated columns 604 to partially buckle or deform, which can assist with decelerating the received delivery and/or UAV, to prevent damage. Additionally, as the landing marker 600 is deflated or reduced, the weight of the delivery and/or UAV will cause the landing marker 600 to collapse about the delivery and/or UAV, which can assist with shielding and/or protecting the received delivery and/or UAV. The collapsed landing marker system 600 can also be retracted to move the received delivery and/or UAV to a storage location for protection and/or shielding of the received delivery and/or UAV.

In some embodiments, the columns 604 of the landing marker 600 can be inflated with an expansion fluid, such as air. The sections 606 interposed between the columns 604 can allow fluid communication between the various portions of the landing marker 600, allowing the expansion fluid to be introduced through a single and/or multiple inlets to inflate, or expand, one or more columns 604 of the landing marker 600. However, the sections 606 may not be inflatable, and may be rigidly formed members, for example.

The amount of inflation and/or expansion fluid of the columns 604 can be controlled in relation to the expected delivery weight. For example, for a heavy delivery, the columns 604 can be inflated to a higher pressure than the inflated pressure of the columns 604 for a lighter delivery due to the difference in weights of the deliveries.

In the example shown in FIG. 6, the columns 604 are shown positioned at the corners of the upper surface 602, however, the columns 604 can vary in location and/or position along and/or on the upper surface 602. For example, additional columns 604 can be disposed interior the periphery of the upper surface 602, extending between the upper surface 602 and a surface upon which the landing marker 600 sits. The columns interior the upper surface 602 periphery can assist with supporting and receiving a delivery and/or UAV.

The upper surface 602 of the landing marker 600 can be constructed of a suitable material that can receive a delivery and/or UAV with minimal damage. In some embodiments, the upper surface 602 can include an inflatable portion that can be in fluid communication with the columns 604 to assist with expansion of the inflatable portion of the upper surface 602. In an example, the upper surface 602 can allow fluid communication between the various columns 604 of the landing marker 600, which can reduce the need for the interposed sections 606. However, the upper surface may be non-inflatable, such as formed of a net or fabric that is stretched or other connected via the columns 604.

Figure 7:
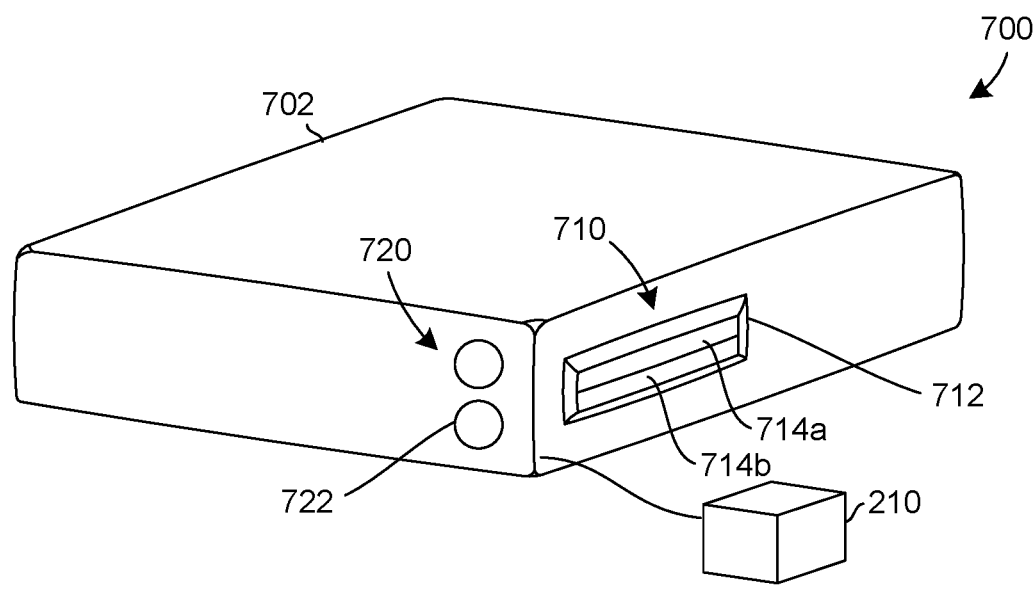
FIG. 7 is a perspective view of yet a further example UAV expandable landing marker.

FIG. 7 is a further example landing marker 700. The landing marker 700 includes various expansion fluid vents (or valves) 710, 720 that can allow a controlled release of expansion fluid from the landing marker 700 in response to a weight being received on the upper surface 702. A received weight, such as a delivery and/or a UAV, will impact the upper surface 702 of the landing marker 700, the landing marker 700 can vent or release a portion of an expansion fluid contained therein to assist with deceleration the received weight. Further, the controlled venting of the landing marker 700 can be variable and/or different based on the impact of the received weight upon the upper surface 702 of the landing marker 700. One or more controlled vents, of various designs and/or venting capabilities, can be placed or disposed on one or more surfaces of the landing marker 700. Additionally, the controlled venting of the expansion fluid can occur remotely from the landing marker 700, the controlled vent in fluid communication with the expansion fluid of the landing marker 700 to allow release of expansion fluid from an interior volume, or portion(s) thereof, of the landing marker 700. Controlled venting of the expansion fluid of the landing marker 700 can also include directing a portion of the expansion fluid to a reservoir separate from and/or in fluid communication with the interior volume, or portion(s) thereof, of the landing marker 700. The vented expansion fluid is transferred to a reservoir from where it can be returned to the landing marker 700 or stored for use in a later expansion process.

An example controlled vent 710 is shown on a side panel of the landing marker 700. The controlled vent 710 includes a pair of panels 714a, 714b that are sealed along an edge by a controlled seal 712. The controlled seal 712 has a pressure threshold, past which the controlled seal 712 will open. If the pressure of the expansion fluid within the interior volume, or portion(s) thereof, of the landing marker 700 exceeds the pressure threshold, such as due to a weight impacting the upper surface 702 causing the landing marker 700 to compress, the controlled seal 712 will open, no longer sealing the pair of panels 714a, 714b, which allows the expansion fluid to vent from the landing marker 700.

The open controlled vent 710 can allow the expansion fluid to vent at a certain rate and/or volume to control the deflation of the landing marker 700 in response to a received delivery. Additionally, the landing marker 700 can include multiple controlled vents, such as 710, with each vent calibrated or set to vent expansion fluid at the same or different pressure thresholds. The various pressure thresholds can allow specific controlled venting of the expansion fluid of the landing marker 700 in response to the properties of the received delivery and/or UAV, such as an impact force, size, weight and other considerations that will apply a pressure to or compress the landing marker 700.

Once the pressure of the expansion fluid within the landing marker 700 falls below the pressure threshold, the controlled vent 710 can stay open allowing expansion fluid to vent at the same or a different rate, or can reseal to prevent or significantly reduce the venting of the expansion fluid from the landing marker 700. In an example, the controlled vent 710 can automatically seal, such as by the panels 714a, 714b engaging each other when they contact after venting at least a portion of the expansion fluid, or the controlled vent 710 can be manually resealed after the reception of a delivery by the landing marker 700.

Another example controlled vent, a flap controlled vent 720, is also shown in FIG. 7. The flap controlled vent 720 includes a flap of material 722 that covers an opening on the exterior of the landing marker 700 that is in fluid communication with the expansion fluid, or portion thereof, of the landing marker 700. The flap of material 722 can include a similar controlled seal as 712m allowing the flap to open and vent expansion fluid based on a pressure of the expansion fluid on the flap of material 722. The flap controlled vent 720 can reseal and/or partially close to reduce the rate of expansion fluid venting from the landing marker 700 once the pressure of the expansion fluid on the flap of material 722 falls. Additionally, the controlled seal of the flap controlled marker 700 can be formed by the flap of material 722 and its properties. For example, the flap of material 722 can be formed of a semi-rigid material that will bend when a threshold force is applied, such as the pressure of the expansion fluid against the flap of material 722. After the pressure of the expansion fluid on or against the flap of material drops 722 below the threshold level, the material properties of the flap of material 722 can cause the material to resume an original, unbent, state against the landing marker 700, preventing further venting of the expansion fluid.

Figure 8:
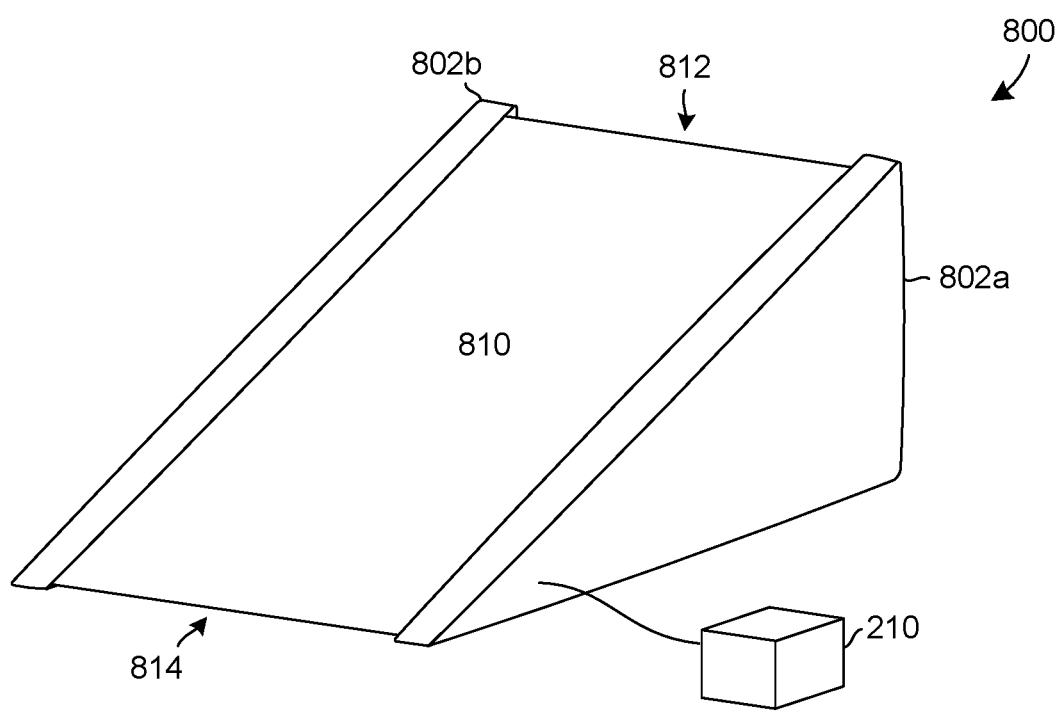
FIG. 8 is a perspective view of an example UAV expandable landing marker used to direct an item toward a predetermined location.

FIG. 8 is a further example landing marker 800 that includes a slide portion 810. A delivery can be received on the slide portion 810. The received delivery can then move along the surface of the slide portion 810 to a location at a lower end 814 of the slide portion 810. In some embodiments, the angled slide portion 810 may cause an item to bounce or deflect toward a direct, after absorbing some energy of the moving item during the deflection. The slide portion 810 may be supported by a pair of inflatable supports 802a, 802b that can be inflated with an expansion fluid to deploy or expand the landing marker 800 without inflating an entire volume of the landing marker 800. The reduced volume of the inflatable supports 802a, 802b can require less expansion fluid to be used to inflate the landing marker 800. However, other volume(s) may be inflated to create the expanded state of the landing marker 800.

To decelerate a received delivery, the slide portion 810 can be constructed of a pliable material that provides a deceleration effect when an object lands on it and/or can be loose. Additionally, the inflated supports 802a, 802b can deform, such as be pulled inward towards the slide portion 810, when a delivery is received on the slide portion 800 to assist with the deceleration of the received delivery. Further, the pressure of the expansion fluid in the inflated supports 802a, 802b can be varied to control the deformation characteristics of the inflated supports 802a, 802b. Once received, the delivery can move across the surface of the slide portion 810, from a higher end 812 to the lower portion 814. The orientation of the landing marker 800 and slide portion 810 can direct the received delivery to a known and/or predetermined location, such as a delivery storage location. In an example, the landing marker 800 can also collapse about the received delivery, similar to the example landing marker 600 of FIG. 6, to cover and/or shield the received delivery.

Figure 9C:
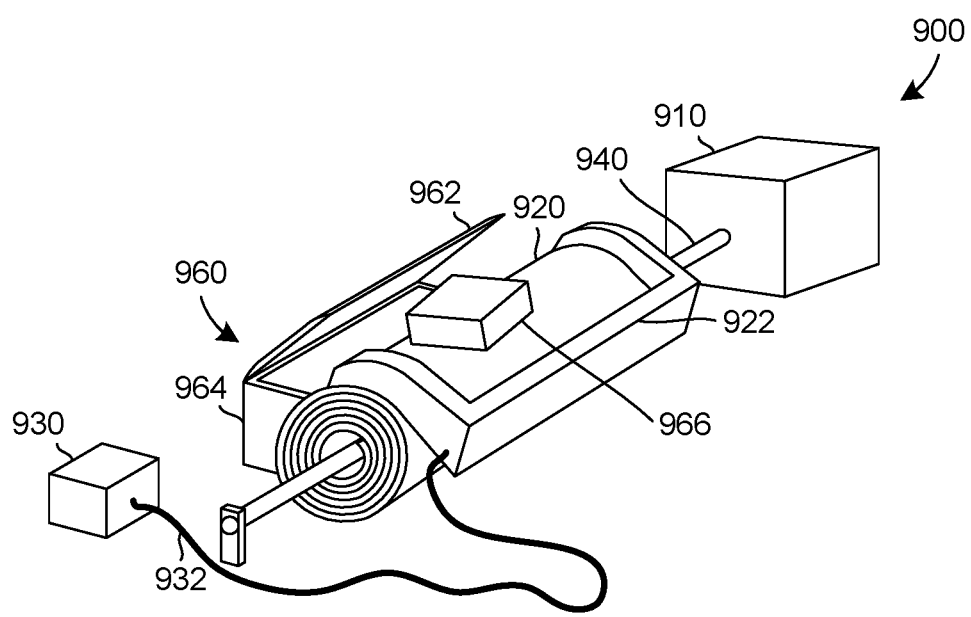

FIGS. 9A-9C illustrate an example UAV expandable landing marker system 900 including a landing marker 920 in an unexpanded, FIG. 9A, an expanded, FIG. 9B, state and a retraction, FIG. 9C, state after receipt of a delivery. The example UAV expandable landing marker system 900 includes a motor 910, the landing marker 920, an expansion mechanism 930, that is connected to a shaft 940 about which the landing marker 920, in an unexpanded state, is wrapped and/or stored. Additionally, an optional delivery storage 960 can be included to store the received delivery. The various elements of the UAV expandable landing marker system 900 can be contained within a housing, such as a previously discussed landing marker system storage 562, and/or can be spread about and housed in multiple housings.

In response to a received signal from an approaching UAV, or another source, regarding a delivery, a controller (e.g., the controller 510 shown in FIG. 5) can initiate the deployment and/or expansion of the landing marker 920. The controller of the UAV expandable landing marker system 900 can be integrated and/or included with another component of the UAV expandable landing marker system 900, such as the expansion mechanism 930 or the motor 910. The motor 910 can rotate the shaft 940 and the attached landing marker 920, to unroll the landing marker 920 in preparation for deployment and/or expansion. However, inflation of the landing marker may cause the landing marker to unroll without use of the motor 910. The expansion mechanism 930 can cause an expansion fluid, such as air, through a connection 932 into the connected landing marker 920, possibly through a fluid connection via the shaft 940. The unrolling of the landing marker 920 and the expansion, or inflation, of the landing marker 920 by the expansion mechanism 930 can occur simultaneously, staggered, in steps, and/or separately.

In an example, the landing marker 920 can include an internal baffle structure(s) that can be filled with the expansion fluid as the landing marker 920 is deployed. The internal baffle structure(s) can increase the rigidity of the landing marker 920 as it is deployed and/or unrolled from the shaft 940. The increased rigidity of the landing marker 920, due to the internal baffle structure(s), can assist with pushing, or moving, the far end of the expanding landing marker 920 away as the shaft 940 is rotated to deploy the landing marker 920. On certain surfaces, such as grass or other friction surfaces, the deploying landing marker 920 can be stopped, or impeded, as it is unrolled due to the rotation of the shaft 940, since the landing marker 920 is not fully expanded and/or rigid. The increased rigidity of the deploying landing marker 920, due to the internal baffle structure(s), can assist with pushing and/or moving the deploying landing marker 920 across the surface by the rotation of the shaft 940.

The internal baffle structure(s) can also include check-valves, or other flow control features and/or elements, along their length through the landing marker 920. The check-valves can assist with properly expanding the internal baffle structure(s) by restraining the expansion fluid to various portions of the internal baffle structure(s) to ensure the internal baffle structure(s) is properly expanded to achieve the desired rigidity of the deploying landing marker 920. In an example, the check-valves can be pressure actuated, that is the check-valve can open and allow the flow of an expansion fluid through the valve when the pressure differential across the check-valve reaches a threshold value. In this manner, a portion of the internal baffle structure(s) can be filled to a desired pressure and/or expanded state, at which point the check-valve can be triggered, allowing expansion fluid to flow into the next portion of the internal baffle structure(s). Due to the pressure differential actuation of the check-valve, the filled/expanded portion of the internal baffle structure(s) will remain so as the next portion of the internal baffle structure(s) is filled and/or expanded.

For example, as the landing marker 920 is deployed by rotating the shaft 940, expansion fluid can flow into the landing marker 920 and the internal baffle structure(s). The internal baffle structure(s) have a smaller volume than the landing marker 920 and will fill and expand faster than the surrounding landing marker 920. The check-valves in the internal baffle structure(s) will restrain the expansion fluid, ensuring that the portion of the internal baffle structure(s) being filled and expanded by the expansion fluid reaches a desired or adequate expanded state before allowing the expansion fluid to flow into and expand the next portion of the internal baffle structure(s). The expanded portions of the internal baffle structure(s) can increase the rigidity of at least a portion of the deploying landing marker 920, with the increased rigidity assisting with the deployment of the landing marker 920 across a surface due to the rotation of the shaft 940.

To retract the landing marker, fluid in the baffle structure(s) is removed before rolling up the landing market. In some embodiments, the fluid in the baffle structure(s) may be removed by creating a vacuum pressure at an end of the landing marker 920 proximate to the shaft 940, which may cause the fluid to pass through the check valves in the same direction as when the baffle structure(s) were expanded, but this time emptying the baffle structure(s). The vacuum may be created by operating the expansion mechanism (e.g., a pump, compressor, etc.) in reverse or using a different vacuum mechanism. Once the baffle structure(s) are deflated due to the vacuum pressure, the landing marker 920 may be rolled-up by the shaft 940.

Various other methods, systems and/or elements for increasing the rigidity of the landing marker 920 as it is deployed can be used. For example, the landing marker 920 can include segmented internal stiffening elements that engage with each other to form an element extending through the landing marker 920 as the landing marker 920 is deployed and can disengage as the landing marker 920 is retracted about the shaft 940. In another example, the stiffening elements that include a magnetorheological fluid that can change viscosity due to an applied magnetic field to increase the rigidity of the landing marker 920 as it is deployed. Other stiffening and/or rigidity increasing elements and/or systems can include mechanical elements and/or systems, electrical elements and/or systems, or a combination thereof.

FIG. 9B illustrates a deployed landing marker 920 of the UAV expandable landing marker system 900 in preparation for receipt of a delivery. The landing marker 920 is shown deployed and/or expanded and is connected to the shaft 940 by a section 924. Additionally, the landing marker 920 can include expandable wall portions 922, which may be an item engagement device 526, as shown in FIG. 5, that can assist with containing the received delivery on an upper surface of the landing marker 920 when the landing marker 900 is retracted and rolled up. Thus, the expandable wall portions 922 may assist in retaining an item and moving it to a different location, such as the delivery storage 960. Further, the deflation, or collapse, of the expandable wall portions 922 can cover and/or shield the received delivery until the delivery can be retrieved.

The delivery storage 960 can include a top portion 962 and a receptacle portion 964. The receptacle portion 964 may include a cavity in which the delivered item, such as a package can be moved for storage. In some embodiments, the top portion 962 can open and close to expose the receptacle portion 964. In the open position, the top portion 962 is open allowing a delivery to be placed in the receptacle portion 964. In the closed position, the top portion 962 can cover the receptacle portion 964 to secure the receptacle portion 964 from intrusion, such as by someone other than the user and from weather. In some embodiments, the top portion 962 may be fixed relative to the receptacle portion 964, while allowing access into the cavity. The delivery storage may be concealed from bystanders by being located behind other objects, being camouflaged, being below grade, and/or using other techniques.

A retraction line 950 may extend through the interior of the landing marker 920, from a point 952 on a farthest extended side of the landing marker 920 to a point 954 of the shaft 940. The retraction line 950 may reduce strain on material that forms the landing marker and/or allow for more even or consistent rolling-up of the landing marker 900. The rotation of the shaft 940 by the motor 910 can also rotate, or roll-up, the retraction line 950 to assist with retraction of the deployed landing marker 920 to a stored, or unexpanded state, such as shown in FIG. 9A. As the landing marker is rolled up, the item may be moved to an item storage location near the shaft 940. For example, the landing marker, when expanded, may cover shared land (e.g., a sidewalk, etc.), but may be retracted to a private space associated with a residence. The item may be deposited on the landing marker 900, and then moved, by retraction of the landing marker 900 and by capture via the expandable wall portions 922, to the private space, which may or may not be a secured location. As the landing marker 900 is rolled up on the shaft 940, fluid may be exhausted from the remaining portion of the landing marker 900. Thus, the expandable wall portions 922 may remain inflated until they are finally rolled up by the shaft, allowing the expandable wall portions 922 to engage the item for an extended period of time, which can assist with moving the received delivery to a delivery storage 960.

FIG. 9C illustrates delivered package 966 being moved into the delivery storage 960. The rolling up of the landing marker 920 moves the package 966 towards the delivery storage 960. The package 966 is deposited into the receptacle portion 964 when the package 966 is moved over the top of the rolled landing marker 920. Once the delivery 966 is in the receptacle portion 964, the top portion 962 of the delivery storage 960 may close to secure the delivered package 966 within the delivery storage 960.

Figure 10A:
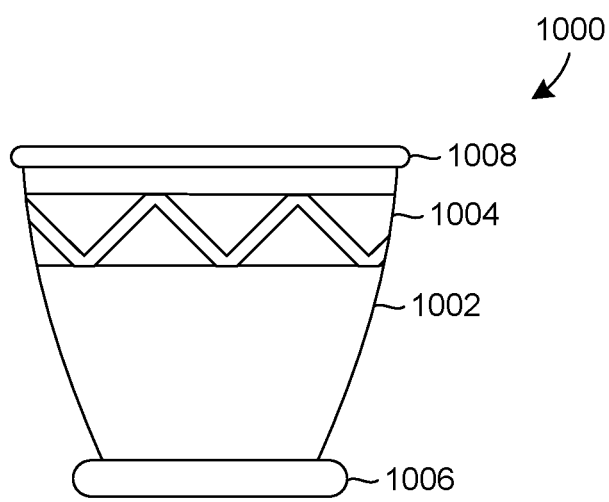
FIGS. 10A and 10B are side elevation views of a further example UAV expandable landing marker that is coupled with a decorative object.
Figure 10B:
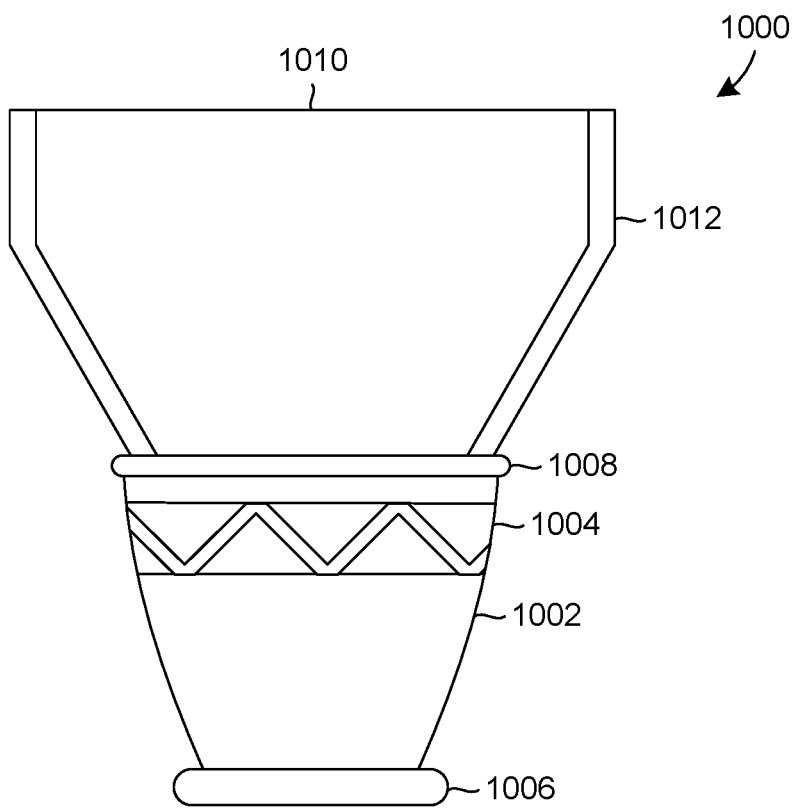

FIGS. 10A and 10B illustrate an example landing marker 1000 that is designed to appear a typical object of the environment. FIG. 10A illustrates the landing marker 1000 in an unexpanded state and FIG. 10B illustrates the landing marker 1000 in an expanded state.

The unexpanded landing marker 1000 of FIG. 10A has a visual appearance of a common object 1002, such as a decorative pot. The common object 1002 includes a base 1006, which can be weighted to assist with preventing movement of the landing marker 1000, a decorative pattern 1004 and a top 1008. Additional elements, components and/or systems of a UAV expandable landing marker system can be stored within the common object 1002, including a controller, an expansion mechanism, retraction mechanism and/or others.

FIG. 10B illustrates the landing marker 1000 in a deployed, or expanded, state. An upper surface 1010 of the landing marker 1000, upon which a delivery will be received, extends above the common object 1002 and has a larger surface area than that of the top 1008 of the common object 1002. The upper surface 1010 is supported by inflated columns 1012 that are anchored in or to the common object 1002. As with previously described landing markers, the columns 1012 can deform upon receipt of a delivery on the attached upper surface 1010. The received delivery will tend to deform the columns 1012 inward, lowering the upper surface 1010 and the received delivery into the common object 1002.

Prior to or during expansion or deployment of the landing marker 1000, the top 1008 of the common object 1002 can be removed or moved to allow the landing marker 1000 to expand. The expanding landing marker 1000 can move the top 1008 or an actuator can be used to move the top 1008. After the receipt of a delivery, the expanded landing marker 1000 can be reduced and/or retracted back into the common object 1002 along with the received delivery. The top 1008 can then be moved back into place to secure, protect, cover and/or shield the landing marker and/or received delivery within the common object 1002. For example, the top 1008 may be secured to the object via a hinge and may be actuated by an actuator between an open position and a closed position. A user or recipient can later remove or move the top 1008 to access and retrieve the received delivery.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more beacons that emit one or more audible signals that are detectable by a unmanned aerial vehicle (UAV), that direct the UAV to a general location of a landing marker, and that indicate a status of the landing marker, the status indicating at least one of an operative status of the landing marker, a warning to the UAV, or a failure of the landing marker, the one or more beacons including a light that flashes in a repeated pattern, changes color in the repeated pattern, or moves in the repeated pattern, the repeated pattern being modified from a first frequency or a first rate to a second frequency or a second rate as the UAV approaches the landing marker, the light or the repeated pattern being unique to a delivery destination for an item being transported by the UAV or a recipient of the item, and the light or the repeated pattern being utilized by the UAV to identify that the delivery destination for the item is a correct delivery destination for the item;
the landing marker including an upper surface with one or more markings that serve as a unique identifier to direct the UAV to a specific location at which the item is to be deposited by the UAV, the landing marker formed of a pliable material, the landing marker including at least the upper surface, a side surface, and a base that enclose a volume that selectively retains air at least temporarily, the landing marker expandable from an unexpanded state to an expanded state by adding the air into the volume;
an air pump in fluid communication with the landing marker that, when actuated, pumps air into the landing marker and expands the landing marker to the expanded state;
an anchor coupled to the landing marker that limits movement of the landing marker at least when the landing marker is in the expanded state;
a vent disposed in the landing marker in fluid communication with the volume that enables air to escape the volume as a result of impact of the item, wherein the vent causes the landing marker to absorb impact forces of the item while retaining the item on the landing marker; and
a controller that is in communication with the air pump and that receives a signal indicating an approach of the UAV delivering the item, wherein the controller actuates the air pump in response to the signal to cause air to at least partially fill the volume and cause the landing marker to expand from the unexpanded state to the expanded state before deposit of the item by the UAV on the landing marker.

2. The system of claim 1, wherein the controller:
selectively actuates the vent to open the vent to cause the landing marker to release air and transition from the expanded state to the unexpanded state after deposit of the item on the landing marker; and
causes the item to be deposited into delivery storage while the landing marker transitions from the expanded state to the unexpanded state, wherein the item is retrievable by the recipient from the delivery storage.

3. The system of claim 1, wherein the landing marker is rolled up when in the unexpanded state and unrolled when in the expanded state, the landing marker to unroll in response to an addition of air into the volume.

4. The system of claim 1, further comprising a retraction mechanism, the retraction mechanism including:
a motor; and
a shaft that is coupled to the motor and that is rotated by the motor, the shaft further coupled to the landing marker such that rotation of the shaft rolls the landing marker about the shaft to retract the landing marker.

5. The system of claim 1, further comprising a storage device to store the landing marker at least prior to expanding the landing marker to the expanded state, the storage device at least temporarily concealing a location of the landing marker.

6. The system of claim 1, wherein the anchor includes one or more cavities or wells that extend downward into an interior of the landing marker and that contain one or more objects that cause the landing marker to be anchored to a physical location at which the landing marker is situated.

7. The system of claim 1, wherein an amount of the air pumped into the landing marker is based on an expected delivery weight of the item, wherein the amount of the air pumped into the landing marker is greater for items having greater expected delivery weights.

8. An apparatus comprising:
a marker formed of a flexible material that creates a volume, the marker expandable from an unexpanded state to an expanded state by modulating an amount of fluid in the volume, the marker including an upper surface that identifies the marker and that receives deposit of an item on the upper surface, the upper surface including one or more first markings that indicate that the marker is in the expanded state and one or more second markings, different from the one or more first markings, that indicate a targeted area at which the item is to be deposited;
an expansion mechanism in fluid communication with the volume of the marker, wherein the expansion mechanism regulates an amount of the fluid at least into the volume to cause the marker to transition from the unexpanded state to the expanded state prior to the deposit of the item;
a controller that is in communication with the expansion mechanism and that receives a signal indicating an approach of an unmanned aerial vehicle (UAV) delivering the item, wherein the controller controls the expansion mechanism in response to the signal to at least partially fill the volume with the fluid to cause the marker to expand from the unexpanded state to the expanded state before deposit of the item on the marker; and
one or more beacons that emit one or more signals that are detectable by the UAV, that direct the UAV to a general location of the marker, and that indicate a status of the marker, the status indicating at least one of an operative status of the marker, a warning to the UAV, or a failure of the marker, the one or more beacons including a light that flashes in a repeated pattern, changes color in the repeated pattern, or moves in the repeated pattern, the repeated pattern being modified from a first frequency or a first rate to a second frequency or a second rate as the UAV approaches the marker, the light or the repeated pattern being unique to a delivery destination for the item being transported by the UAV or a recipient of the item.

9. The apparatus of claim 8, wherein the marker includes at least one of a code or image on the upper surface that can be imaged by the UAV to identify at least one of the marker, a marker location, or a position on the upper surface of the marker.

10. The apparatus of claim 8, wherein the controller includes a radio that receives the signal from at least one of the UAV or from a user device, the controller to emit a signal to guide the UAV toward the marker.

11. The apparatus of claim 8, further comprising an anchor that couples to the marker to substantially restrain motion of the marker, wherein the anchor is integrated with the marker and includes an anchor volume separate from the marker, the anchor volume fillable with a medium including one of a weighted object or a liquid, wherein the marker is rolled up when in the unexpanded state and is unrolled when in the expanded state, the marker unrolling in response to an addition of fluid into the volume.

12. The apparatus of claim 8, further comprising a retraction mechanism that includes a shaft rotatable by a motor, the motor rotating the shaft to retract the marker from the expanded state to the unexpanded state.

13. The apparatus of claim 12, wherein the marker includes an item-engagement feature that retains the item on the marker during retracting of the marker, the item-engagement feature concealing the item from view until the item is retrieved by a recipient of the item.

14. The apparatus of claim 8, wherein the marker includes at least a valve in fluid communication with the volume, the valve selectively opening to release at least a portion of the fluid.

15. The apparatus of claim 8, wherein the marker includes an elastic material.

16. The apparatus of claim 8, wherein the volume of the marker orients at least a portion of the upper surface to be non-parallel with a ground, and wherein the at least the portion of the upper surface redirects the item, after deposit on the upper surface toward a different location.

17. The apparatus of claim 8, wherein the volume includes at least three columns that, when at least partially filled with fluid, support the upper surface above a ground.

18. A system comprising:
one or more beacons that emit one or more signals that are detectable by an unmanned aerial vehicle (UAV), that direct the UAV to a general location of a landing marker, and that indicate a status of the landing marker, the status indicating at least one of an operative status of the landing marker, a warning to the UAV, or a failure of the landing marker, the one or more beacons including a light that flashes in a repeated pattern, changes color in the repeated pattern, or moves in the repeated pattern, the repeated pattern being modified from a first frequency or a first rate to a second frequency or a second rate as the UAV approaches the landing marker, the light or the repeated pattern being unique to a delivery destination for an item being transported by the UAV or a recipient of the item;
the landing marker including an upper surface having one or more markings that serve as a unique identifier to direct the UAV to a specific location at which the item is to be deposited by the UAV, the landing marker formed of a flexible material that creates a volume, the landing marker expandable from a rolled up and unexpanded state to a substantially unrolled and expanded state by adding fluid to the volume;
an expansion mechanism in fluid communication with the volume of the landing marker, wherein the expansion mechanism adds fluid into the volume to cause the landing marker to substantially unroll from the unexpanded state to the expanded state prior to depositing of the item; and
a controller that is in communication with the expansion mechanism and that causes the expansion mechanism to add the fluid into the volume to substantially unroll the landing marker and expose the upper surface.

19. The system of claim 18, further comprising a shaft coupled to a motor, the shaft at least assisting in rolling the landing marker up to stow the landing marker in the unexpanded state.

20. The system of claim 18, further comprising a housing that at least partially covers the landing marker in the unexpanded state.

\* \* \* \* \*